(12) United States Patent
Fischer et al.

(10) Patent No.: US 10,945,328 B2
(45) Date of Patent: Mar. 9, 2021

(54) CONTROL SYSTEM FOR ELECTRICALLY CONTROLLED INSTALLATIONS

(71) Applicant: KEBA AG, Linz (AT)

(72) Inventors: Harald Fischer, Linz (AT); Robert Kreundl, Raffelstetten (AT); Bernhard Lehner, Hirschbach (AT); Gernot Preisinger, Linz (AT); Manfred Schininger, Linz (AT)

(73) Assignee: KEBA AG, Linz (AT)

( * ) Notice: Subject to any disclaimer, the term of this patent is extended or adjusted under 35 U.S.C. 154(b) by 294 days.

(21) Appl. No.: 15/999,283

(22) PCT Filed: Feb. 10, 2017

(86) PCT No.: PCT/AT2017/060024
§ 371 (c)(1),
(2) Date: Aug. 17, 2018

(87) PCT Pub. No.: WO2017/139817
PCT Pub. Date: Aug. 24, 2017

(65) Prior Publication Data
US 2020/0352007 A1    Nov. 5, 2020

(30) Foreign Application Priority Data
Feb. 18, 2016 (AT) ............... A 50108/2016

(51) Int. Cl.
*G08B 5/22* (2006.01)
*H05B 47/17* (2020.01)
(Continued)

(52) U.S. Cl.
CPC ............... *H05B 47/17* (2020.01); *F16P 3/00* (2013.01); *G05B 9/02* (2013.01); *G08B 5/38* (2013.01);
(Continued)

(58) Field of Classification Search
CPC ....................................... H05B 47/17
(Continued)

(56) References Cited

U.S. PATENT DOCUMENTS 9,349,546 B2  5/2016  Dotson
2002/0190610 A1 * 12/2002 Andre .............. H02N 2/18
                                                310/339
(Continued)

FOREIGN PATENT DOCUMENTS

DE      9013448 U1    1/1992
DE    199 19 012 A1   11/2000
(Continued)

OTHER PUBLICATIONS

International Search Report of PCT/AT2017/060024, dated May 22, 2017.

*Primary Examiner* — Tai T Nguyen
(74) *Attorney, Agent, or Firm* — Collard & Roe, P.C.

(57) ABSTRACT

The invention relates to a control system for electrically controlled installations. The control system comprises at least one portable, mobile manual operator-control instrument for display of information and for input of control commands by an operator-control person. The manual operator-control instrument is provided with at least one manually actuatable safety switching element, with which safety element an illuminating device is associated. The control system comprises an illumination control device, which is designed for electrically and/or electronically controlled adaptation of a visually perceptible luminous intensity of the illuminating device.

19 Claims, 5 Drawing Sheets

(51) Int. Cl.
  *H05B 47/11* (2020.01)
  *F16P 3/00* (2006.01)
  *G05B 9/02* (2006.01)
  *G08B 5/38* (2006.01)
  *H01H 71/02* (2006.01)
  *H01H 71/04* (2006.01)

(52) U.S. Cl.
  CPC ............ *H01H 71/02* (2013.01); *H01H 71/04* (2013.01); *H05B 47/11* (2020.01)

(58) Field of Classification Search
  USPC ............... 340/815.45, 815.53, 517, 521, 525
  See application file for complete search history.

(56) References Cited

U.S. PATENT DOCUMENTS

| | | |
|---|---|---|
| 2003/0039114 A1 | 2/2003 | Douzono et al. |
| 2007/0096935 A1 | 5/2007 | Lee et al. |
| 2007/0101393 A1* | 5/2007 | Ito ............................ G06F 8/65 725/132 |
| 2014/0374232 A1 | 12/2014 | Hanada et al. |
| 2015/0199041 A1 | 7/2015 | Salter et al. |
| 2015/0370230 A1* | 12/2015 | Duchene ............ G05B 19/0426 700/275 |

FOREIGN PATENT DOCUMENTS

| | | |
|---|---|---|
| DE | 103 44 385 A1 | 5/2005 |
| DE | 10 2006 029 067 A1 | 1/2008 |
| DE | 10 2015 111 647 A1 | 2/2016 |
| EP | 1 780 738 A1 | 5/2007 |
| EP | 2 763 151 A1 | 8/2014 |
| JP | 2004-319258 A | 11/2004 |

\* cited by examiner

CONTROL SYSTEM FOR ELECTRICALLY CONTROLLED INSTALLATIONS

CROSS REFERENCE TO RELATED APPLICATIONS

This application is the National Stage of PCT/AT2017/060024 filed on Feb. 10, 2017, which claims priority under 35 U.S.C. § 119 of Austrian Application No. A50108/2016 filed on Feb. 18, 2016, the disclosure of which is incorporated by reference. The international application under PCT article 21(2) was not published in English.

BACKGROUND OF THE INVENTION

1. Field of the Invention

The invention relates to a control system for electrically controlled installations.

2. The Prior Art

In industrial practice it is customary to execute production workflows or fabrication processes and the like by means of one or more fully automatically and/or semi-automatically controlled machine(s), which in some cases may be combined as extended installations with a large number of installation components. As an example, these processes often comprise workflows or movements in which masses, energies, forces, temperatures, radiations, substances, etc. that are involved may lead in principle to a hazard for the health or even the life of persons. For the most part, this is true especially in the case of occurrence of unusual or improper exceptional situations or faults.

Therefore it is expedient and also common or stipulated to dispose manually actuatable safety switching elements at readily accessible and clearly visible locations in the surroundings or in the region of installation components and machines or machine parts, in order to permit the fastest possible reaction of operator-control persons to hazardous situations for unequivocal termination of a hazard situation. During manual actuation of such safety switching elements, an installation or installation component or machine may be switched into a safe state. Depending on type or configuration of a respective installation or installation component, a switching into a safe state or operating condition may be achieved by disconnection of drive devices or actuators, interruption of the energy supply, activation of brake devices or similar actions.

Such safety switching elements comprise, for example, the known Emergency Off or Emergency Stop switches configured in mushroom shape. In order to be able to identify such safety switching elements clearly and with absolute certainty, specific colored markings are proposed for the purpose and in many cases stipulated in pertinent standards. Hereby, for example, even for persons who are not specifically trained in operator control of an installation or installation component, a correspondingly color-coded Emergency Off switch as well as its action is nevertheless clearly recognizable or familiar.

Even though the processes and workflows in industrial fabrication are largely automated by functional electronic control devices, which are able to act functionally effectively on electrically controllable components of an installation, a manual operation or control by a human operator is expedient or necessary for certain workflows or tasks. Some examples of these are the establishment of settings or of a tool change, elimination of operating malfunctions or defects, or the so-called teaching of robots.

At the present time, mobile or transportable operator-control instruments are frequently used for workflows or sequences that necessitate the manual input of control commands by a human operator-control person. Such mobile operator-control instruments permit an operator-control person a certain mobility in the region of an installation or machine. It is of advantage in this connection that the operator-control person is able to assume a suitable or favorable observation position in the region of a machine during the manual operator control.

In principle, such mobile manual operator-control instruments may be linked via hard-wired or wireless communication links to one or more functional control devices of an electrically controllable installation and/or installation component for the supply or transmission of data, signals and control commands. The input of control commands to such a manual operator-control instrument coupled using signal technology and data technology may be transmitted via corresponding communication links to a control device, which control device then converts the transmitted or supplied control commands immediately into corresponding control signals for actuators, drives, heating means or cooling means, or other electrically controllable machine components. From the viewpoint of safety technology, it is of great advantage in this connection when at least one safety switching element, for example in the manner of an Emergency Off or Emergency Stop switch, is also provided on a manual operator-control instrument.

Whereas manual operator-control instruments connected in fixed manner or permanently to a certain installation component or machine are entirely common, the trend in the modern industrial practice lies increasingly in the direction of variable or temporary assignment of a manual operator-control instrument to an installation component or machine. Stated in other words, the desire is being increasingly expressed to connect or to couple a manual operator-control instrument using control technology, especially for the manual input of control commands, to a functional control device only during that time in which manual operator-control actions are also being actually carried out. This is also the case mainly because, during proper or malfunction-free automatic operation of an installation or installation component, the coupling of a manual operator-control instrument to the manual supply of control commands is not necessary. During proper automatic operation, a communication line for the transmission or supply of manually input control commands may therefore be canceled, for example by unplugging of a corresponding cable connection or by interruption of a corresponding wireless radio link or even by cancellation of a coupling based on data technology in a communications network. Hereby even potential hazards due to a possible faulty operator control can be suppressed, for example if an operator-control person inadvertently actuates an input element to initiate a control command to the manual operator-control instrument, without being in the region close to the corresponding installation component or machine.

However, due to the only temporary operative connection, using control technology, of such manual operator-control instruments to functional control devices of an installation, a direct function of safety switching elements disposed on the manual operator control instrument also exists only temporarily. In particular, in manual operator-control instruments positioned in the region of an installation component, it is often not immediately or directly apparent for an operator-control person or even for third-party persons not scheduled for operator control of the installation or installation component or machine, whether a manual operator-control instrument is connected communication-wise using control technology to a control device of the system, or whether a safety switching element on the manual operator-control instrument can be actuated in functionally effective manner. As a remedy, organizational measures are often stipulated, according to which a manual operator-control instrument that is not functionally effective is to be cleared away, for example, or moved out of the visible area. In practice, it is shown by experience that such organizational measures are implemented only incompletely. Consequently, it is possible in principle for a mistake to be made concerning the functional effectiveness of a safety switching element disposed on a manual operator-control instrument. Upon occurrence of an acute hazardous situation, a passage of valuable time may occur subsequently due to ineffective actuation of an Emergency Stop safety switching element on the manual operator-control instrument in an attempt at termination of the hazard situation.

From the viewpoint of safety technology, it is therefore absolutely desirable that the functional effectiveness or respectively the ineffectiveness of a safety switching element on a manual operator-control instrument be apparent as clearly and unmistakably as possible for an operator-control person or even for third parties.

From the prior art, illuminated Emergency Off switches with translucent or semitransparent shell surfaces are known, in which, by luminous means associated with the Emergency Off switch, especially integrated in the Emergency Off switch, the corresponding Emergency Off switch is made recognizable in colored manner. EP 1780738 A1, DE 19919012 A1, JP 2004319258 A or DE 102006029067 A1 describe Emergency Off switching elements in which the corresponding luminous means are activated in the plugged-in or coupled condition of a manual operator-control instrument, while in contrast the luminous means are deactivated in the uncoupled condition of the manual operator-control instrument or in the case of deenergized manual operator-control instruments. In the deactivated state of the luminous means, the correspondingly non-illuminated Emergency Off switch appears in a neutral color coding, for example milky gray or white.

During use of such actively illuminated safety switching elements, however, problems that have not yet been considered in the prior art arise in industrial practice. In particular, in actively illuminated safety switching elements with constant luminous intensity, the visually perceptible or visually sensed brightness perception and the color perception by human persons is very strongly dependent on the respective prevailing ambient brightness. In the case of safety switching elements illuminated actively with constant luminous intensity, it cannot be assured with adequate safety that the functional effectiveness or ineffectiveness of a safety switching element is always recognizable reliably and unambiguously for human persons and simultaneously an ergonomic and especially dazzle-effect-free use of the manual operator-control instruments is possible in the presence of fluctuating ambient brightnesses.

Furthermore, especially in wirelessly data-coupled battery-powered manual operator-control instruments, a high current consumption may occur, by which the functioning time of a manual operator-control instrument may be reduced. This also happens because illuminated Emergency Off switches must be illuminated with adequate, relatively high luminous intensity for reliable perceptibility even in the presence of high ambient brightness.

The task of the invention was to solve the existing problems and to provide an improved control system, by which especially the ambient-brightness-dependent perception of actively illuminated safety switching elements by human persons is considered.

This task is accomplished by a control system according to the claims.

SUMMARY OF THE INVENTION

A control system for electrically controlled installations is provided that comprises at least one control device for monitoring and/or control of the installation and/or of installation components.

Furthermore, the control system comprises at least one portable, mobile manual operator-control instrument for display of information and for input of control commands by an operator-control person, wherein the manual operator-control instrument is provided with at least one manually actuatable safety switching element, with which safety element an illuminating device having at least one luminous means is associated.

Moreover, the control system comprises a couplable and disconnectable signal link between the safety switching element of the manual operator-control instrument and the at least one control device or a separately constructed safety controller, wherein the control system is designed for transformation of the installation or one or more installation components to a safe state upon presence of a coupled signal link and upon manual actuation of the safety switching element, and wherein the control system is designed for activation of the illuminating device upon presence of a coupled signal link and is designed for deactivation of the illuminating device upon presence of a disconnected signal link.

It is important that the control system comprises at least one illumination control device, which is designed for electrically and/or electronically controlled adaptation of a visually perceptible luminous intensity of the illuminating device upon presence of a coupled signal link between the safety switching element of the manual operator-control instrument and the at least one control device or the safety controller.

In this connection, it is entirely possible that the control system comprises several illumination control devices, which are respectively designed for adaptation of a visually perceptible luminous intensity of the illuminating device of the manual operator-control instrument after a coupling or establishment of a signal link has occurred between the safety switching element of a manual operator-control instrument and a control device of the control system.

By virtue of the specified features, a technical resource is supplied by means of which the visually perceptible luminous intensity of a safety switching element can be changed in principle, and especially the visually perceptible luminous intensity can be adapted to respective prevailing light conditions or to a respective ambient brightness. Thus it may also be assured that the color coding of the safety switching element is reliably perceptible by human persons, especially operator-control persons, in presence of the coupled signal link between the safety switching element and the at least one control device.

Thereby it is possible, for example, to prevent an illuminated safety switching element from being poorly functionally effective or no longer recognizable as functionally effective in the presence of high ambient brightness, such as in well lit workplaces, or in bright sunlight.

On the other hand, it is possible to prevent a considerable dazzle effect from occurring for a human operator-control person at workplaces or installation components with low ambient brightness or weak illumination, such as in a coating facility. Any detrimental effects with respect to the manual operability of such a weakly lit installation component can be suppressed in this way. Such a control system is of great advantage in particular for use in expansive working environments or installations with illumination conditions that vary greatly locally.

The signal link between the at least one safety switching element of the manual operator-control instrument and the at least one control device can in principle be constructed either in hard-wired or wireless manner.

In addition, by virtue of the specified features, an energy-efficient operation, especially of battery-powered manual operator-control instruments, is made possible. Especially for manual operator-control instruments data-coupled or signal-coupled wirelessly, the energy consumption can be restricted to a necessary extent and thus the battery run time or the functional run time of the manual operator-control instrument can be advantageously increased with the possibility of adaptation or reduction of the luminous intensity to an extent appropriate or necessary in the respective situation.

In one improvement, it may be provided that at least one manually positionable input-setting means is associated functionally effectively with the at least one illumination control device, wherein the illumination control device is designed for electrically and/or electronically controlled adaptation, on the basis of the respective setting of the input-setting means, of the visually perceptible luminous intensity of the illuminating device upon presence of a coupled signal link between the safety switching element and the at least one control device and upon positioning of the input-setting means by an operator-control person.

In this way an operator-control person is able to adapt or set the visually perceptible luminous intensity of the illuminating device and thus of the safety switching element automatically and in a manner corresponding to the respective individual needs of the operator-control person.

In a preferred embodiment, it may be provided that the at least one illumination control device is designed for electrically and/or electronically controlled adaptation of the visually perceptible luminous intensity of the illuminating device within a restricted range between a minimum limit intensity that is defined or can be predetermined using control technology and a maximum limit intensity that is defined or can be predetermined using control technology.

By virtue of the minimum limit intensity, a visually perceptible minimum luminous intensity can be predetermined that permits a sufficiently reliable perception of a functionally effective safety switching element for an ambient brightness to be expected in the region of a particular installation component or at a particular workplace. By the maximum limit intensity, on the other hand, a maximally adjustable, visually perceptible luminous intensity can be predetermined, by which the luminous intensity can be restricted for light-sensitive workplaces, such as in coating chambers, for example, or the like.

In this connection, the respective minimum and/or maximum limit intensities in expansive installations with different ambient brightnesses in the region of the installation components can respectively be appropriately adaptable. In this way, moreover, a manual positioning or adaptation of the visually perceptible luminous intensity by an operator-control person is possible only in the restricted area, whereby unsuitable or defective or too low or too high luminous intensity settings, for example, can be prevented. In particular, it is possible in this way to prevent damage or shortening of the useful life of the luminous means (singular and plural) of the illuminating device due to setting of two high visually perceptible luminous intensities.

In a further configuration form, it may be provided that at least one acquiring means for monitoring of user activities is provided, which acquiring means is designed for signaling an acquired presence or an acquired absence of user activities relative to the at least one illumination control device.

Thereby a means is provided by means of which it is possible to detect whether or not a manual operator-control instrument is being used. By provision for or signaling of this information relative to the illumination control device, the adaptation of the luminous intensity of the illuminating device can be accordingly adapted.

For example, an embodiment may be practical in which the at least one illumination control device is designed for electrically and/or electronically controlled adaptation of the visually perceptible luminous intensity to a first low level upon presence of a coupled signal link and during a signaling of a presence of user activities and is designed for electrically an/or electronically controlled adaptation of the visually perceptible luminous intensity to a second level, higher in comparison with the first level, upon presence of a coupled signal link and during a signaling of an absence of user activities.

In this way, the visually perceived luminous intensity of the illuminating device or of the at least one safety switching element can be reduced when an operator-control person is executing operator-control or observation tasks by means of the manual operator-control instrument. Thereby both the operator-control comfort and the operator-control safety and reliability can be improved, and in particular a working without dazzle effect due to a safety switching element illuminated with too high luminous intensity can be permitted with the manual operator-control instrument. In the case of an absence of user activities, on the other hand, the luminous intensity of the illuminating device and thus the illuminating power of the safety switching element can be increased by means of the illumination control device in order to make the safety switching element recognizable even for persons at larger distance from the manual operator-control instrument and thus easily findable in the emergency situation.

In a further expedient embodiment of the control system, it may be provided that it comprises, on the machine side, at least one remote coupling station, which is associated with a nearby electrical controllable installation component, wherein the at least one remote coupling station is designed at least for establishment and for disconnection of the signal link between the at least one safety switching element of the manual operator-control instrument and a control device of the installation and/or installation component.

By association of such remote coupling stations respectively with particular installation components, an association of a manual operator-control instrument or its safety switching element(s) with different installations can be achieved. In particular, different light conditions or ambient brightnesses in the nearby region of the various installation components can be taken into consideration in the course of planning of the safety measures. At the same time, a non-confusable and intuitive capability for coupling of a manual operator-control instrument is provided for an operator-control person.

In this connection, it may be expedient that the at least one remote coupling station is assigned a code, which code contains information, obtained using data technology, with respect to a minimum limit intensity and/or an optimum level for the visually perceptible luminous intensity in the region of the associated installation component, and the at least one illumination control device is designed for direct acquisition of the code or for indirect acquisition of the code via a code-acquiring means, and for electrically and/or electronically controlled adaptation of the visually perceptible luminous intensity on the basis of the information about the code obtained using data technology.

By virtue of this embodiment, it is possible to supply, for the at least one illumination control device, an information for the adaptation of the luminous intensity of the illuminating device that takes into consideration the ambient brightness conditions to be expected in the region of the installation components concerned. As an example, the code can be saved as a data record in a memory element of the remote coupling station, and read out by the at least one illumination control device during coupling of the manual operator-control instrument. Alternatively, a code may also be saved directly in a memory element of an illumination control device itself and thus be supplied directly for the at least one illumination control device. In principle, sensory acquisition via a code-acquiring means of a code configured to be correspondingly sensorily acquirable, for example by a sensor configured on the manual operator-control instrument. On the basis of the information obtained using data technology and supplied by the code, the luminous intensity of the illuminating device can be adapted correspondingly by the illumination control device. In this connection, the code can be provided with at least one information obtained using data technology via a minimally necessary minimum level for the luminous intensity or a minimal limit intensity at a respective remote coupling station or an installation component associated with a remote coupling station, and can also supply, for the at least one illumination control device, at least one information, obtained using data technology, about an optimal level for the visually perceptible luminous intensity in the region of the corresponding installation component.

In a further embodiment, it may be provided that the at least one illumination control device comprises at least one first switching means, and the illumination control device is designed for activation or respectively deactivation of the illuminating device by switching of the first switching means to an electrically conducting or respectively an electrically non-conducting switched state.

This configuration variant permits an efficient switching on and off of the illuminating device by connection or respectively disconnection or interruption of an energy supply for the illuminating device.

In this case it may be expedient that the at least one illumination control device is designed for variable adaptation of the energy supply for the illuminating device. For example, the illumination control device may be designed for the supply of the illuminating device with electrical current having variable voltage and/or variable amperage. In this way, a variable adaptation of the visually perceptible luminous intensity of the illuminating device is subsequently made possible.

It may also be expedient, however, that the at least one illumination control device is designed for electrically and/or electronically controlled adaptation of the visually perceptible luminous intensity of the illuminating device by impression of a pulse-width-modulated activation signal on the first switching means.

This configuration variant permits an activation of the illuminating device or its visually perceptible luminous intensity in a manner that is simple using switching technology but is nevertheless efficient. In this case, the visually perceptible luminous intensity can be regulated or predesignated by the illumination control device via variation of the pulse-pause ratio of the pulse-width-modulated activation signal. By prolongation of the pause intervals of the pulse-width-modulated activation signals, it is possible, for example, to decrease the visually perceptible luminous intensity, wherein the visually perceived or sensed luminous intensity of the illuminating device or of the safety switching element results from the reaction inertia of the human eye. In particular, in case of sufficiently short duration and sequence or clock frequency of the pulse intervals and of the pause intervals that follow one another sufficiently rapidly, only the average luminous intensity is perceived by a human eye, as is inherently known. By activation or regulation of the illuminating device via a pulse-width-modulated activation signal, moreover, a high energy efficiency is achievable for the luminous means (singular and plural) of the illuminating device.

As regards viewpoints of safety technology, it may additionally be practical that the at least one illumination control device comprises a second, switchable switching means for activation or respectively deactivation of the illuminating device, which second switching means is connected electrically in series with the first switching means.

In this way, a technically redundant embodiment for deactivation of the illuminating device is supplied. In particular, even during a failure of one of the switching means or in the case of a defective first or second switching means, the illuminating device may be reliably switched off by interruption of its energy supply by means of the respective other switching means. In this way, the risk of a signaling of a functional effectiveness of the safety switching element that is false or misleading for a person is also minimized. Naturally the second switching means may also be impressed in principle with a pulse-width-modulated activation signal from the illumination control device.

In this connection, it may also be expedient that at least one checking means for the checking of the conduction state or switched state of the switching means (singular and plural) is associated with the at least one illumination control device, and the illumination control device is designed for the checking of the proper non-conducting switched state of the switching means (singular and plural) by means of the at least one checking means upon presence of a deactivated state of the illuminating device.

Thereby a further feature is created using safety technology, by means of which a deactivation of the illuminating device can be monitored reliably by the at least one illumination control device. The checking means may be formed, for example, by a current-measuring means, which is designed for monitoring of a non-conducting state of the energy-supply line for the illuminating device. Alternatively, the checking means may also be formed by a light-acquiring sensor, which is associated with the illuminating device or the safety switching element and which is designed for detection of a deactivated, i.e. non-conducting illuminating device.

In this case it may be provided, moreover, that the at least one illumination control device is designed for execution of a test cycle, which test cycle comprises, in periodic sequence, alternately the switching of one of the switching means respectively into a non-conducting state, and which comprises the simultaneous switching of the other switching means (singular and plural) into a conducting state.

By execution of such a test cycle, the functionality of each of the switching means can be cyclically checked by means of the checking means. Thus individual defects can be reliably recognized before a loss of safety can develop due to a further defective switching means. The at least one illumination control device may subsequently be designed for display or signaling of a detected defect, for example a defective switching means.

It may also be expedient, however, when a signal-link-state checking means is associated using signal technology with the at least one illumination control device, which signal-link-state checking means is designed for the continuous checking of the coupling state of the signal link, and that the illumination control device is designed for activation of the illuminating device in the case of a coupled state of the signal link, and is designed for deactivation of the illuminating device in the case of a disconnected state of the signal link.

Hereby the coupling state of the signal link between the safety switching element of the manual operator-control instrument and the at least one control device is monitored continuously by the illumination control device by means of the signal-link-state checking means. Subsequently, therefore, an automatic activation or an automatic deactivation of the illuminating device by the illumination control device can be executed in dependence on the detected coupling state of the signal link.

In one improvement, it may be provided that the at least one illumination control device is structurally disposed in the remote coupling station on the machine side.

This configuration form is particularly expedient in a hard-wired version of the signal link between the at least one safety switching element of the manual operator-control instrument and the at least one control device. In particular, the signal link can be designed in this case as a hard-wired safety circuit. By virtue of this configuration form of the control system, the structural complexity of the manual operator-control instruments can be advantageously minimized. Moreover, the structural arrangement of the at least one illumination control device in the remote coupling station represents a particularly safe configuration form for the moving of the illumination control device. In principle, every remote coupling station of the control system or only some of the existing remote coupling stations in this configuration form may be provided respectively with an illumination control device. This favors in particular the creation of particularly compact manual operator-control instruments, since both components, based on switching technology, from the mobile instrument can be swapped out into the stationary remote coupling station, and even any loss power emerging at switching means does not have to be removed from a compact housing with relatively small surface.

It may also be provided, however, that the at least one illumination control device is structurally disposed in the manual operator-control instrument.

This configuration variant is advantageous in particular for use of signal links that can be coupled in hard-wired manner or wirelessly between the safety switching element and the at least one control device. This is also because, in such cases, the energy or current supply for the illuminating device, which is varied electrically or electronically by the illumination control device for adaptation of the visually perceptible luminous intensity, is stored by an electrical current source likewise disposed on the manual operator-control instrument.

In one advantageous embodiment, it may be provided that the at least one illumination control device is connected using data technology to at least one first luminous-intensity-sensitive sensor means, which first sensor means is structurally disposed in a region close to the safety switching element or within the safety switching element, and which sensor means is designed for acquisition of the ambient brightness in the region close to the safety switching element.

Hereby an efficient acquiring means for acquisition of the current ambient brightness can be provided for an illumination control device, specifically in the region close to the safety switching element, and not merely a general information about the ambient brightness at a workplace is supplied. By such a sensor means, changes of the ambient brightness are also acquirable that can result, for example by a change of position or situation of the manual operator-control instrument, for example by moving the manual operator-control instrument into regions of an installation component shadowed by machine parts or components, or possibly by a covering of the safety switching element and the like.

Subsequently, it may be expedient that the at least one illumination control device is designed for automatic electrically and/or electronically controlled adaptation of the visually perceptible luminous intensity of the illuminating device on the basis of the acquired ambient brightness, and/or is designed for automatic dynamic imposition of a minimum limit intensity for the illuminating device on the basis of the acquired ambient brightness.

Thus a means is provided for automatic adaptation or regulation of the visually perceptible luminous intensity during a change of the ambient brightness. In this way, for each existing or detected ambient brightness, a visually perceptible luminous intensity that is as optimum as possible can be set respectively for a safety switching element associated functionally effectively and illuminated via the signal link, or at least a minimally necessary limit intensity can be defined in automated manner. Hereby it can be ensured with high reliability that a functionally effective safety switching element is also recognizable as functionally effective.

In connection with the acquisition of the ambient brightness, it may additionally be expedient when the control system comprises at least one light source associated nearby an installation component, which light source is designed for emission of a coded light signal, and that the first luminous-intensity-sensitive sensor means is designed for acquisition and supply of the coded light signal of the light source relative to the illumination control device.

Hereby, information contained in coded light signals is acquirable by means of the first sensor means and can be used relative to the illumination control device for further information processing and/or information transmission.

For example, it may be provided that the illumination control device is designed for the supply of an information via an acquisition of a coded light signal relative to a control device and/or a safety controller, and that the respective control device and/or safety controller is designed for release at least of observation-relevant control commands only in the case of a supply of an information via an acquisition of a coded light signal by the illumination control device.

Thereby the surroundings of a particular machine or installation component can be lit with a light signal having an installation-specific coding. Subsequently, it can be ensured that particular operator-control commands, especially control commands relevant to observation, can be executed only as long as the operator-control person is situated at least in the field of view of the respective installation component or machine and is able to visually acquire and monitor the effect of his or her operator-control actions. This can be advantageous for a safe operation of an installation, especially in the case of wirelessly coupled manual operator-control instruments with potentially large communication range.

In this connection, a transmission and evaluation of the coded light signal may also take place, for example, in the course of the establishment of a radio link between a wirelessly coupled manual operator-control instrument and a control device of the installation or installation component. Thus a non-confusable assignment of a manual operator-control instrument is additionally made possible.

It may also be expedient, however, when the at least one illumination control device is connected using hard-wired data-signal technology to a second luminous-intensity-sensitive sensor means, which second sensor means is structurally disposed in a region close to the safety switching element or within the safety switching element, and which second sensor means is designed for acquisition of an actual value of the luminous intensity of the illuminating device.

Thereby a means for monitoring of the luminous means (singular and plural) of the illuminating device or of the control electronics of the illuminating device is provided in principle. For example, by virtue of this second sensor means, it is possible to check whether the illuminating device is basically functioning. Ultimately, the operating reliability of the control system can be effectively improved by such a sensor means.

For example, it may be provided that the at least one illumination control device is designed for comparison of the acquired actual value of the luminous intensity of the illuminating device with a target value that is internally defined and/or generated using control technology for the luminous intensity, and that the illumination control device is designed, on the basis of the comparison during detection of an overshoot of a defined limit value for a permissible deviation of the actual value from the target value, for the supply of a target-value error signal relative to a control device and/or a safety controller of the control system.

By virtue of this configuration form, a detected error or a defective function of the illuminating device or of the control electronics for the illuminating device can be displayed directly. Subsequently, it is possible, for example, to initiate a repair or servicing action immediately, and so the operating safety of the control system can be preserved.

It may also be provided that the at least one illumination control device is designed for adaptation of the visually perceptible luminous intensity by impression of a pulse-width-modulated activation signal on the illuminating device, and the second sensor means is designed for acquisition and for supply, for the illumination control device, of a time profile of the pulse-width-modulated light emitted by the illuminating device, and that the illumination control device is designed for the checking of the proper function of the illuminating device by comparison of a sensor signal, acquired during a pulse time interval of the pulse-width-modulated activation signal, of the second sensor means with a sensor signal, acquired during a pause time interval of the pulse-width-modulated activation signal, of the second sensor means, and the illumination control device is designed for the supply of a pulse-pause error signal relative to a control device and/or to a safety controller of the control system upon a negative checking result.

Thereby a means for the checking of the pulse-width-modulated activation signal for the illuminating device is provided for the at least one illumination control device. In particular, it is possible to check, for the illumination control device, whether the pulse-width-modulated activation signal is also mirrored with sufficient amplitude in the time profile of the pulse-width-modulated light, detected in time-resolved manner, of the illuminating device or of the luminous means of the illuminating device. In principle, a continuous function test both of the illuminating device and of the second sensor means and of the switching means (singular and plural) is provided by the specified features. For example, switching errors in the activation of the illuminating device, which may be manifested by constant luminosity of the illuminating device, can be detected in this way. As an example, such errors may be caused by defective electronic switching means.

Furthermore, it may be provided that the at least one illumination control device is designed for comparison of the sensor data supplied by the first sensor means and/or the second sensor means with reference data that can be stored in the control system, and that the illumination control device is designed for the supply of a deviation error signal relative to a control device and/or to a safety controller of the control system upon an overshoot of a permissible deviation of the sensor data from the reference data.

By virtue of these features, an additional means for detection or recognition of changes relative to a proper original state is provided for the at least one illumination control device. For example, possible damage or dirt and the like on the safety switching element or the illuminating device can be recognized in this way. In principle, manipulation attempts, for example by a covering of the safety switching element or elements of the manual operator-control instrument, may also be recognized in this way. By immediate signaling of a detected error via the deviation error signal, the illumination control device is able to display a safety-relevant impairment of the function of the control system immediately. Subsequently, the at least one control device or the safety controller may be designed, for example, as a barrier to the input of control commands or for non-implementation of control commands entered on the concerned manual operator-control instrument.

From the viewpoint of acquisition technology, it may also be additionally provided that the at least one illumination control device comprises a current-measuring means for determination of the electrical current flow drawn by the illuminating device, and that the illumination control device is designed for comparison of the acquired current flow data with reference data stored in the control system, and that the illumination control device is designed for the supply of a current-flow error signal relative to a control device and/or to a safety controller of the control system upon an overshoot of a predesignated deviation of the determined current-flow data from the reference data.

Thereby a further configuration variant for monitoring of the proper function of the illuminating device is provided for the illumination control device. By acquisition of the current flow, especially defects of electronic switching means and lines as well as defective luminous means of the illuminating device can be recognized efficiently by the illumination control device. By virtue of the error signaling, the illumination control device is again able to display such an error directly.

Subsequently, it may be provided that the control device and/or the safety controller is designed for immediate transformation of the installation or of the affected installation components into a safe state upon supply of an error signal by the illumination control device.

Upon supply of an error signal, i.e. a target-value error signal, deviation error signal, pulse-pause error signal and/or of a current-flow error signal, for example, a reduction or a loss of the operating safety can be immediately suppressed or prevented in this way. In particular, by virtue of a correspondingly configured control system, the installation or an affected installation component or machine can be immediately switched into and maintained in a safe state until, for example, a defective safety switching element or a defective illuminating device has been repaired again or is functionally ready once again or, for example, a fully functional manual operator-control instrument with functioning safety element or elements is coupled instead of the defective manual operator-control instrument.

In this connection, it may be provided that the control device and/or the safety controller is designed for coupling using signal technology, in a way signal-equivalent to a manually actuated safety switching element, of an error signal into a safety circuit for the installation or the installation component.

Thereby a safe and reliable means for switching an installation or an installation component into a safe state is provided when an error signal is supplied by the illumination control device, i.e. an error is reported.

It may also be provided, however, that the control device and/or the safety controller is designed for the blocking of safety-relevant control commands and/or for the display of the error signal or of the error signals upon supply of an error signal by the illumination control device.

By the specific display of certain error signals supplied by the illumination control device, servicing or repair actions can be selectively initiated, since an additional information about the nature of the error that has occurred has been made available. The nature of the error signals that have occurred may also be saved or logged in the manner of an error log for information purposes or for follow-up. The blocking of control commands is an effective action, using safety technology, in order to prevent the tripping of control commands via the affected manual operator-control instrument in the event of a defect of a safety switching element or illuminating device for a safety switching element, so that a fully functional manual operator-control must be used for this purpose.

In an advantageous improvement, it may be provided that the at least one illumination control device is designed for comparison of the acquired actual value of the luminous intensity of the illuminating device with a target value that is internally defined and/or generated using control technology for the luminous intensity, and that the illumination control device is designed, on the basis of the comparison, for electrical and/or electronic correction of the visually perceptible luminous intensity of the illuminating device.

By virtue of this configuration variant, changes of the luminous intensity generated by the illuminating device can be acquired and corrected. In particular, long-time deviations, for example an aging-related decrease of the luminous intensity of the luminous means (singular and plural) of the illuminating device can be acquired and corrected appropriately by the illumination control device using regulation technology.

In principle, during use of a first and second sensor means, a continuous functional test can be performed. During joint use of a first and of a second sensor means, moreover, a mutual or reciprocal influence between the acquisition of the illumination of the safety switching element and especially of the acquisition of a coded working-area lighting can be simply compensated computationally. This even during adaptation of the visually perceptible luminous intensity by impression of a pulse-width-modulated activation signal on the illumination control device.

In a further embodiment, it may be provided that the first sensor means and the second sensor means have a common intensity-acquiring element, and the at least one illumination control device is designed for periodic polling of the intensity-acquiring element during pulse time intervals and pause time intervals of a pulse-width-modulated activation signal for the illuminating device.

In the case of the design of the illumination control device for use of a pulse-width-modulated activation signal for the adaptation of the luminous intensity of the illuminating device, both the luminous intensity of the illuminating device and the ambient brightness can be acquired in principle by this technical feature using a single intensity-acquiring element. This information about luminous intensity and ambient brightness is then mapped in the time profile of the pulse and pause phases, detected by means of the intensity-acquiring element, of the light emitted by the illuminating device. Furthermore, this configuration variant represents a structurally simple and space-saving implementation for the acquisition both of the luminous intensity and also of the ambient brightness.

In this connection, it may be of advantage when the at least one illumination control device is designed for determination of the ambient brightness from the sensor data polled during pause time intervals.

The precise acquisition of the ambient brightness is possible by this feature of the illumination control device regardless of whether the illuminating device is activated or deactivated, i.e. can or cannot be perceived as illuminated. Thus interferences during the measurement of the ambient brightness are suppressed by an illuminating device that in principle is activated. Subsequently, even malfunctions during the ambient-brightness-dependent electronic adaptation of the visually perceptible luminous intensity can be suppressed, since the ambient brightness is determined or acquired by the illumination control device only in the pause phases or pause time intervals of the pulse-width-modulated activation signal. Moreover, special measures for cancellation of an interfering influence of an activated illuminating device during the determination of the ambient brightness, such as shadowing measures, for example, for sensor means or sensor devices designed for acquisition of the ambient brightness, are rendered unnecessary.

In principle, a configuration variant may be expedient in which the first and/or the second sensor means and/or the common intensity-acquiring element is or are disposed structurally within the shell of the safety switching element.

Hereby especially the structural configuration of the manual operator-control instrument can be constructed more efficiently, since no separate recess for a sensor means, for example, or for the intensity-acquiring element has to be provided in the housing of the manual operator-control instrument. In the case of the acquisition of the ambient brightness by means of a sensor means or intensity-acquiring element disposed within the safety switching element, the shell of the safety switching element may in principle have the function of a diffusing lens, so that the ambient light incident on the shell from all directions is acquired evenly by the sensor means, and the sensor means or the intensity-acquiring element acquires not merely a light incident from one preferential direction.

Furthermore, it may be provided that the at least one illumination control device is designed for electrically and/or electronically controlled adaptation of the illuminating device by a display signal, especially by a visually perceptible flashing signal, in the case of an actuated safety switching element.

Thereby an actuated safety switching element is readily recognizable as such even in expansive or spacious installations with many safety switching elements disposed in distributed manner. This configuration variant permits a rapid and non-confusable finding of an actuated safety switching element, so that the installation or the corresponding installation component can be started up once again immediately after appropriate settlement of a hazardous situation or elimination of an error. In this connection, a flashing signal may also be delivered in such a way that the luminous intensity fluctuates periodically between a higher and a lower intensity, although the safety switching element is continuously illuminated in the process and is recognizable with certainty as a functionally effective safety switching element.

Finally, a configuration form may also be of advantage in which the illuminating device has several differently colored luminous means and that the at least one illumination control device is designed for separate electrically and/or electronically controlled adaptation of the individual luminous means.

Thereby several options for identification of a safety switching element are provided in principle. In particular, different country-specific regulations or standards for color coding of safety switching elements can be taken into consideration hereby.

BRIEF DESCRIPTION OF THE DRAWINGS

For better understanding of the invention, it will be explained in more detail on the basis of the following figures,
wherein, respectively in greatly simplified schematic diagrams.

DETAILED DESCRIPTION OF THE PREFERRED EMBODIMENTS

By way of introduction, it is pointed out that like parts in the differently described embodiments are denoted with like reference symbols or like structural part designations, wherein the disclosures contained in the entire description can be carried over logically to like parts with like reference symbols or like structural-part designations. The position indications chosen in the description, such as top, bottom, side, etc., for example, are also relative to the figure being directly described as well as illustrated, and these position indications are to be logically transferred to the new position upon a position change.

Figure 1:
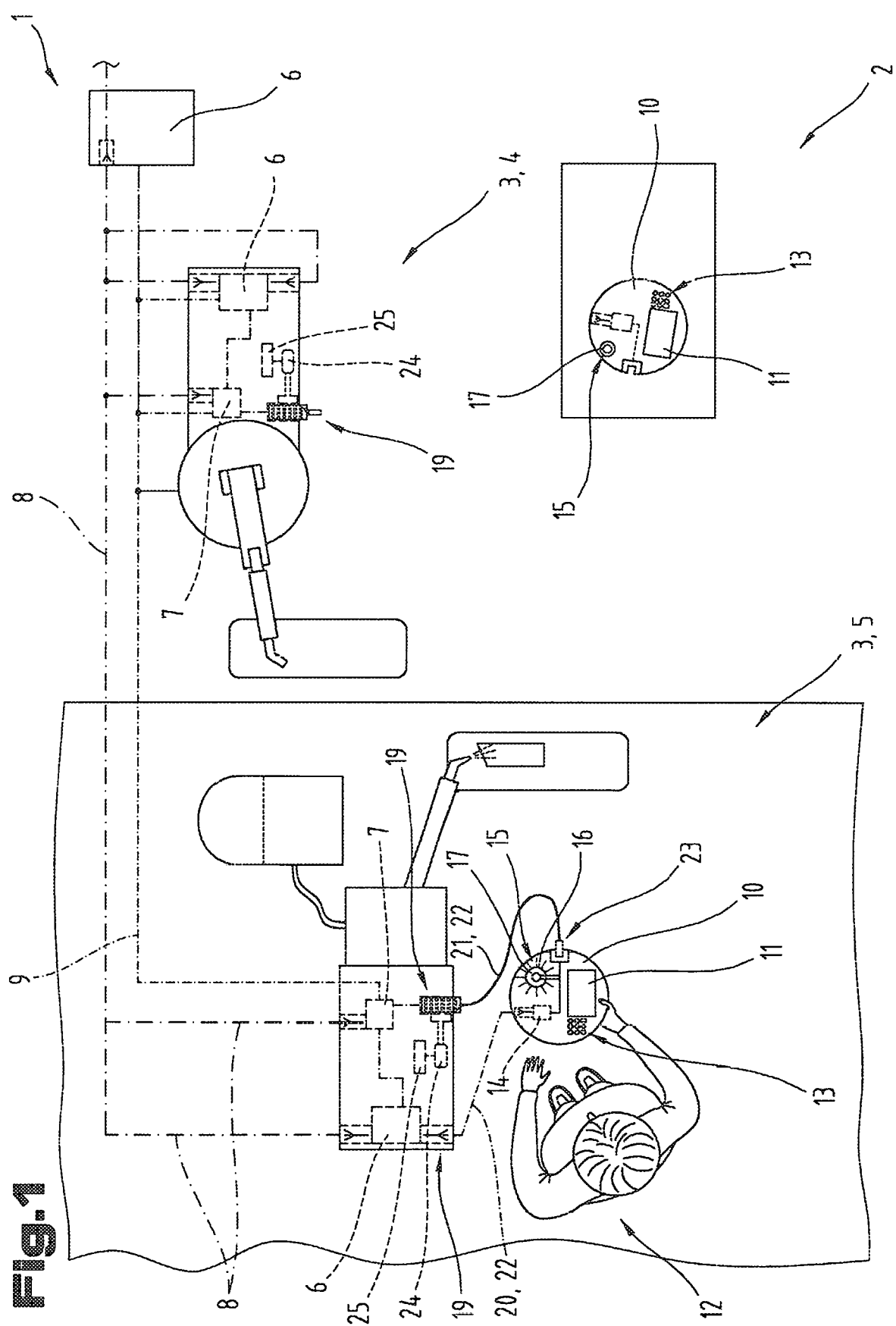
FIG. 1 shows, in sectional views, an exemplary embodiment of a control system as well as of an installation with installation components electrically controlled with the control system.

FIG. 1 schematically illustrates a control system 1 as well as, in sections, an installation 2 electrically controlled with the control system 1. The illustrated system 2 comprises several system components 3, which may be designed differently or serve different working purposes. Thus such different installation components 3 may be configured differently using control technology. Furthermore, an installation 2 may be provided with installation components 3 or workplaces, which are differently lit or exhibit different ambient brightnesses, depending on the respective given requirements, among other factors. As examples for such different installation components 3, a robot processing station 4 as well as sectional views of an automatic coating chamber 5 are illustrated in FIG. 1.

In particular, the robot processing station 4 in FIG. 1 is illustrated as an example of a well lit workplace or of an installation component 3 with relatively high ambient brightness. In contrast, the coating chamber 5, which is spatially separated or partitioned off from the remaining installation 2, is illustrated as an example of an installation component 3 with relatively low ambient brightness. The latter by way of example, because light-sensitive substances or paints are often processed in such coating chambers 5. Obviously a technical installation 2 may comprise any further installation components or machines, which further installation components may in turn have respectively different ambient brightnesses.

As is illustrated in FIG. 1, the control system 1 has at least one control device 6. The control system 1 illustrated by way of example and in sectional views in FIG. 1 comprises several control devices 6, wherein the control devices 6 may be designed for electronic processing or execution of different tasks. Some of the illustrated control devices 6 may be designed, for example, for activation of actuators, material feed devices, etc. of the machines or installation components 3 of installation 2 by primarily functional control devices 6. Other control devices 6 may in turn be higher-level control devices for execution of installation-wide workflows. Moreover, specially designed safety controllers 7 may be present, which may be designed specially for electronic execution or implementation of workflows and processes, based on safety technology, of installation 2.

As is now customary, the individual control devices 6 or safety controllers 7 may be in communication with one another via wireless communication links 8 and/or hard-wired communication link 9 using network technology based on signal or data technology. In this connection, the specific configuration form of such a control network or its network architecture is basically freely selectable or may be freely adapted to the respective circumstances and requirements.

Control system 1 further comprises at least one portable, mobile manual operator-control instrument 10. Such manual operator-control instruments 10 are usually provided with output means 11 for display of information, installation diagrams or parameter information, etc. for an operator-control person 12, and with input means 13, for example for input or initiation of control commands by the operator-control person 12. As a rule, corresponding manual operator-control instruments 10 naturally also comprise at least one electronic controller 14.

Figure 2:
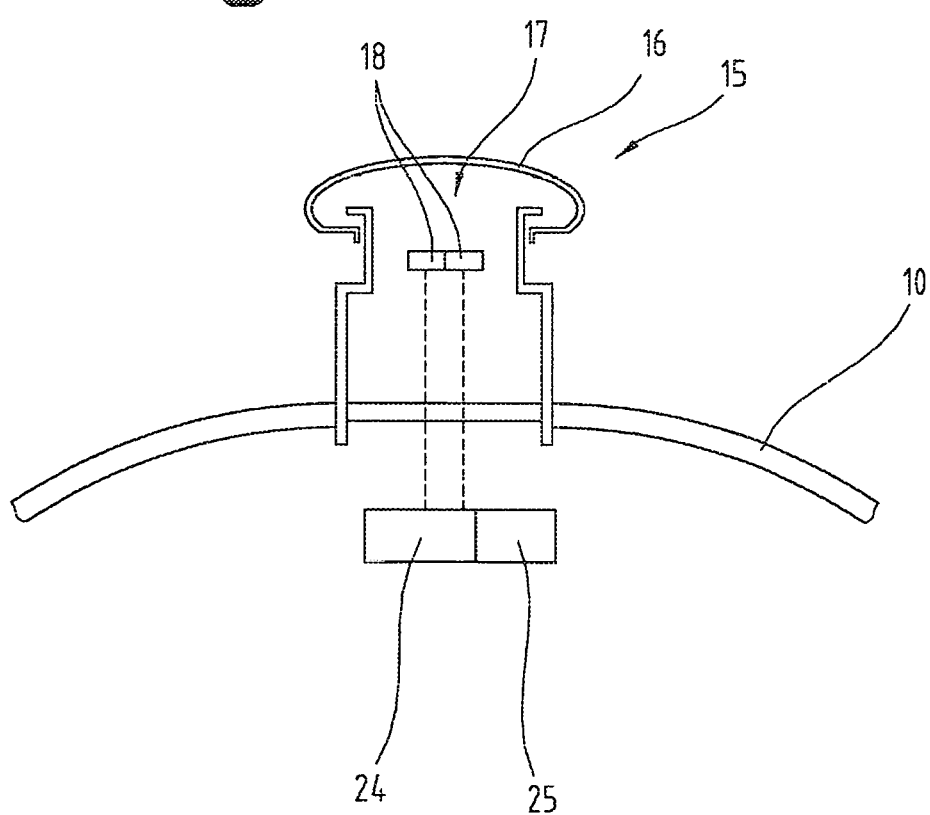
FIG. 2 shows, in sectional view, an exemplary embodiment of a safety switching element with an illuminating device.

The at least one manual operator-control instrument 10 of the control system 1 has at least one safety switching element 15 to be actuated manually, wherein the safety switching elements 15 illustrated in FIG. 1 have a translucent shell 16 or sheath, as is illustrated schematically in FIG. 2 in particular.

Such safety switching elements 15 may be formed in particular by so-called Emergency Off or Emergency Stop switches, which Emergency Off switches are usually configured with a mushroom-shaped shell 16, especially in order to permit an actuation that is as safe and rapid as possible by a person.

As is evident in FIG. 2 and is also illustrated in simplified manner in FIG. 1, an illuminating device 17 is associated with the safety switching element 15, which illuminating device 17 has at least one luminous means 18. According to the exemplary embodiment illustrated in FIG. 1 and FIG. 2, the illuminating device 17 is preferably disposed in the interior of the safety switching element 15 or within the shell 16 of the safety switching element 15. As is illustrated in FIG. 2, the illuminating device 17 may also comprise several luminous means 18, wherein the luminous means 18 may be formed in principle by any kind of light or lamp. Preferably, light-emitting diodes or LEDs are used as luminous means 18.

When an illuminating device 17 is switched on or activated, the light of the illuminating device 17 or of the luminous means 18 passes through the semi-transparent shell 16 or sheath of the safety switching element 15 and can therefore be perceived with a visually sensed or perceivable luminous intensity by a person. In the process, the sensed or perceived luminous intensity is jointly determined by the inherently known sensitivities or light sensitivities of the human eye.

In this connection, the embodiment illustrated in FIG. 1 and FIG. 2 represents merely one example of the configuration of a safety switching element 15 with illuminating device 17 disposed within a translucent shell 16. Alternatively to the configuration form illustrated in FIGS. 1 and 2, a shell of an illuminated safety switching element may also be designed or provided with apertures for the passage of light, or with openings for the passage of luminous means or light-guiding or light-generating elements. Furthermore, it is conceivable in principle that the shell itself is provided with luminous means or the shell itself represents the illuminating device, or that the shell has a coating that generates light directly. As a further example, a configuration form is also possible in which a safety switching element or an Emergency Off switch is illuminated by luminous means disposed around and outside a shell of the safety switching element.

As is illustrated in FIG. 1, the portable mobile manual operator-control instruments 10 are provided for communication, using signal technology or data technology if necessary, with a control device 6 of the control system 1, in order, for example, that specific installation components 3, 4, 5 may be manually operator-controlled if necessary. In a preferred embodiment, remote coupling stations 19, which may be associated respectively with an electrically controllable installation component 3, 4, 5, may be provided for this purpose on the machine side.

In the exemplary embodiment shown, the manual operator-control instrument 10 illustrated at the left in FIG. 1 is connected wirelessly with the control device 6 associated with the coating chamber 5 via a remote coupling station 19 using radio technology, for example via radio link 20, or with the safety controller 7 via a remote coupling station 19 via a cable 21. As an example, this radio link 20 may be provided primarily for the supply of information to the manual operator-control instrument 10 and, via the cable 21, for example, control commands from the manual operator-control instrument 10 may be supplied primarily for the control device 6. As an example, the cable 21 may be formed by an inherently known data-transmission cable, which may comprise several signal lines or data-transmission lines, but naturally may also be provided with other components, such as shieldings, for example.

At this place it is pointed out that obviously other embodiment variants are also conceivable for interfacing a manual operator-control instrument using signal or data technology, for example purely wireless communication links, using signal or data technology, between a manual operator-control instrument 10 and a control device 6 or safety controller 7. In the example shown, the manual operator-control instrument 10 illustrated at the right in FIG. 1 is not linked to communicate with the control device 6 or the safety controller 7 of the robot processing station 4 using signal or data technology.

The control system 1 comprises, between the safety switching element 15 of the manual operator-control instrument 10 and the at least one control device 6 or a separately constructed safety controller 7, at least one signal link 22, which may be coupled or decoupled as needed. The remote coupling stations 19 illustrated in FIG. 1 may be provided in this case for interfacing or coupling the at least one safety switching element 15 of the manual operator control instrument 10 using signal technology. In this way, the at least one remote coupling station 19 may be provided at least for establishment and for disconnection of a signal link 22, which can be coupled and decoupled as needed, between the safety switching element or elements (15) of a manual operator-control instrument 10 and a safety device 6 or safety controller 7.

In the case of the manual operator-control instrument 10 according to FIG. 1, illustrated on the right, the signal link between the safety switching element 15 and the safety controller 7 or the control device 6 of the robot processing station 4 is disconnected, or no signal link is established for the at least one safety switching element 15 of this manual operator-control instrument 10. The safety switching element 15 of the corresponding manual operator-control instrument 10 illustrated at the left in FIG. 1 is operatively connected to the safety controller 7 at least in hard-wired manner or via the cable 21 via the illustrated signal link 22 using signal technology.

Preferably, a signal link 22 between a safety switching element 15 of a manual operator-control instrument 10 and a control device 6 or safety controller 7 can be routed in hard-wired manner, as is also illustrated in FIG. 1. The establishment of the signal link 22 may take place by a simple plugging of the cable 21 via suitable plug connections on the manual operator-control instrument 10 and/or of the remote coupling station 19. For example, it may be provided that the cable 21 is disposed movably or rollably on the remote coupling station 19 and can be connected to the manual operator-control instrument 10 by establishment of the signal link 22 between the safety switching element 15 and the safety controller 7 via a plug connection 23. In such cases, a hard-wired signal link 22 may also be constructed as a safety circuit or be routed via the cable 21. Regarding the construction of such safety circuits, reference is made at this place to the technical literature in this respect, especially to pertinent technical standards and execution procedures.

In principle, a signal link 22 between a safety switching element 15 and a control device 6 or safety controller 7 may be created or established using signal technology or else wirelessly, as is likewise illustrated in FIG. 1. As an example in such cases, a corresponding signal link 22 may take place using radio technology via log-on protocols, which may require the entry of identification data or passwords.

Regardless of the exact construction of a signal link 22 between a safety switching element 15 of a manual operator-control instrument 10 and a control device 6 and/or a safety controller 7, the control system 1 is designed for transformation of the installation 2 or one or more installation components 3 to a safe state upon presence of a coupled signal link 22 and upon manual actuation of the safety switching element 15.

Furthermore, the control system 1 is designed for activation of the illuminating device 17 upon presence of a coupled signal link 22, and is designed for deactivation of the illuminating device 17 upon existence of a disconnected or decoupled signal link 22. For this purpose, it is possible to provide, for example, an electrical current-supply means 24, which can be switched on and off or connected and disconnected. Depending on configuration form, especially in dependence on the embodiment of the signal link 22, i.e. on whether a process of switching on and off wirelessly or in hard-wired manner can be carried out for the illuminating device, in principle in diverse ways. In the case of a hard-wired embodiment of the signal link 22 between the safety switching element 15 and a control device 6 or a safety controller 7, a switching of the illuminating device 17 on or respectively off may be achieved in simple manner by the switching elements, which switch mechanically in the course of a process of plugging the cable 21 in or respectively unplugging it. Obviously, however, electronically controlled solutions are also suitable for this purpose.

It is important that the control system 1 comprises at least one illumination control device 25, which is designed for electrically and/or electronically controlled adaptation of a visually perceptible or visually sensed luminous intensity of the illuminating device 17 upon presence of a coupled signal link 22 between the safety switching element 15 of the manual operator-control instrument 10 and the at least one control device 6 or a separately constructed safety controller 7. Preferably, this illumination control device 25 is also designed for switching the illuminating device 17 on and off in principle, for example by switching the electrical current supply means 24 on and off or connecting and disconnecting it, as is illustrated in the exemplary embodiment according to FIG. 1.

The illumination control device 25 is designed for adaptation or imposition or regulation of the visually perceptible or sensed luminous intensity of the illuminating device 17. For this purpose it may be provided, for example, that the illumination control device 25 is designed for variation of the supply current via the electrical current supply means 24 for the illuminating device 17 for adaptation of the luminous intensity. However, alternative design variants are also possible, which will be further explained in detail.

Figure 3:
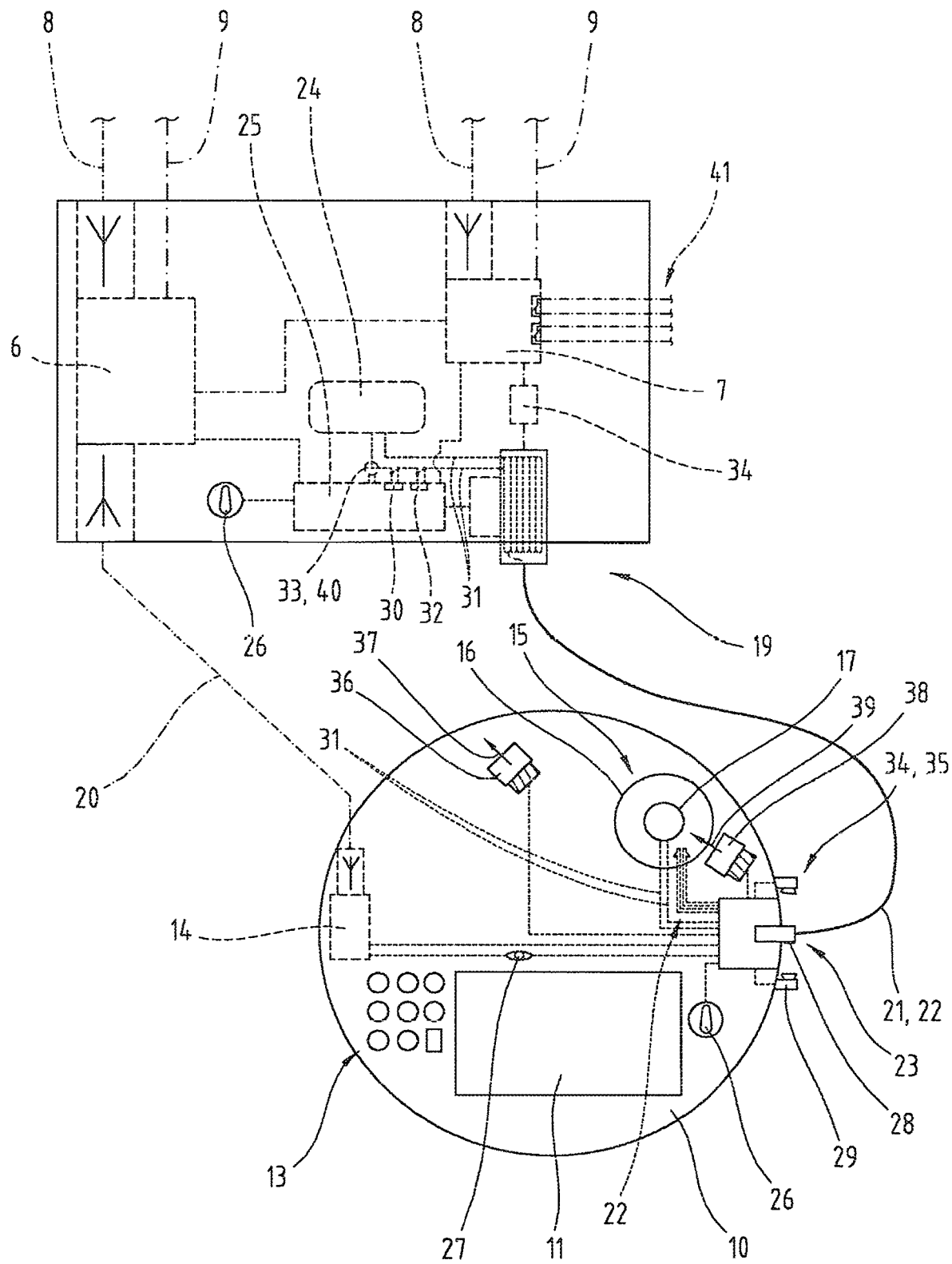
FIG. 3 shows, in sectional views, an exemplary embodiment of a configuration variant of the control system with an illumination control device.

As illustrated in FIG. 1, it may be provided that the illumination control device 25 is structurally disposed in the remote coupling station 19 on the machine side. Such an arrangement or configuration form of the control system 1 may be of advantage, especially expediently in the case of hard-wired signal links 22 between the safety switching element 15 of the manual operator-control instrument 10 and a control device 6 or safety controller 7 of the control system 1. Such a configuration variant is also illustrated in FIG. 3, wherein, for better clarity, a manual operator-control instrument as well as further components of the control system 1 are illustrated in sectional views in FIG. 3 that are larger in comparison to FIG. 1. Like reference symbols or structural-part designations, such as used in FIG. 1 and FIG. 2, are used in FIG. 3 for like parts. To avoid unnecessary repetitions, the detailed description for FIG. 1 and FIG. 2 is invoked or reference is made thereto.

Figure 4:
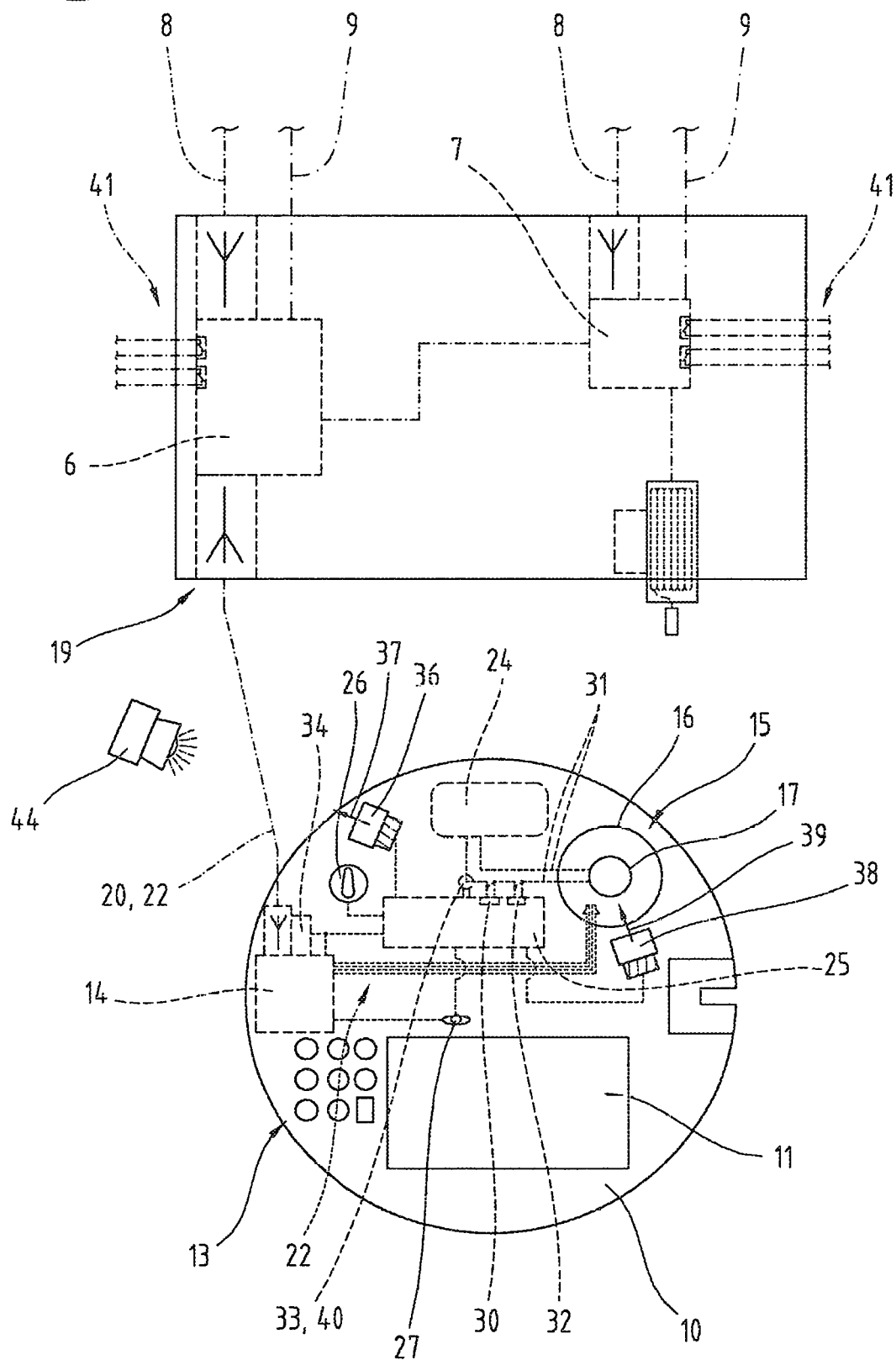
FIG. 4 shows, in sectional views, an exemplary embodiment of a further configuration variant of the control system with an illumination control device.

Alternatively to the configuration form of the control system 1 illustrated in FIG. 1 or FIG. 3, it is also possible, however, that the at least one illumination control device 25 is structurally disposed in the manual operator-control instrument 10. Such an exemplary embodiment is illustrated in FIG. 4, wherein like reference symbols or structural-part designations, such as used in FIG. 1 to FIG. 3, are also used once again in FIG. 4 for like parts. In particular, the embodiment illustrated in FIG. 4 may be expedient for a purely wireless signal link 22 between the safety switching element 15 and a control device 6 or safety controller 7 of the control system 1. In the case of a purely wireless signal link 22, for example using radio technology, a current supply means 24 for the electrical current supply of the illuminating device 17 may be disposed or integrated naturally on or in the manual operator control instrument 10.

In principle, the exemplary embodiments illustrated in FIG. 3 and FIG. 4 represent alternative solutions, especially for configuration of the signal link 22. At this place, however, it must be pointed out that the embodiment shown in FIG. 3 may in principle also be combined with the embodiment shown in FIG. 4. In principle, the control system may therefore also comprise respectively both an illumination control device 25 in a remote coupling station 19 and an illumination control device 25 in a manual operator-control instrument 10, wherein the control system 1 in such cases may be designed for selection of the illumination control device 25 for the electrical or electronic adaptation of the visually perceptible luminous intensity of the illuminating device 17. Alternatively, it could also be provided that an appropriate selection will be made by an operator-control person.

Regardless of the configuration or routing of the signal link 22 using signal technology, at least one manually positionable input-setting means 26 may be associated functionally effectively with the at least one illumination control device 25. For this purpose, the illumination control device 25 may be designed for electrically and/or electronically controlled adaptation, on the basis of a respective setting of the input-setting means 26, of the visually perceptible luminous intensity of the illuminating device 17 upon presence of a coupled signal link 22 and upon positioning of the input-setting means 26 by an operator-control person 12.

A manually positionable input-setting means 26 may be formed, for example, by a rotary or slide regulator connected functionally effectively to the illumination control device 25. Obviously, input-setting means 26 in the manner of plus and minus keys or other configuration variants are also conceivable. In principle, such an input-setting means 26 may be disposed on the manual operator-control instrument 10 itself, wherein, in the case of an illumination control device 25 disposed in the manual operator-control instrument, the input-setting means 26 can be directly functionally associated with the illumination control device 25. By way of example, this case is illustrated in FIG. 4. In the case of an illumination control device 25 disposed in the remote coupling station 19, an input-setting means 26 placed on the manual operator-control instrument 10, however, may also be functionally associated with the corresponding illumination control device 25, for example by a functional link routed via the cable 21, as is illustrated by way of example in FIG. 3. As is also apparent in FIG. 3, obviously corresponding input-setting means 26 may also be placed additionally in the region of a remote coupling station 19 at a position that is as well accessible as possible.

In general, but especially also for prevention of operator-control errors concerning the luminous intensity of the illuminating device 17, it may be provided that the at least one illumination control device 25 is designed for electrically and/or electronically controlled adaptation of the visually perceptible luminous intensity of the illuminating device 17 within a restricted range between a minimum limit intensity that is defined or can be predetermined or adapted using control technology and a maximum limit intensity that is defined or can be predetermined or adapted using control technology. Thus the minimum and maximum limit intensity may be respectively defined or saved by the illumination control device 25 in electronically readable form, for example in a memory unit of a control device 6, 7 of the control system 1 or of a memory unit of the illumination control device 25 itself. Alternatively, however, it may also be provided that the illumination control device 25 is designed for predesignation or adaptation of the corresponding limit intensities for the luminous intensity by using control technology. This may be done, for example, on the grounds or basis of sensors etc. connected to the illumination control device 25, as will be explained in more detail in the following.

As is illustrated in FIG. 3 and also FIG. 4, the control system 1 may comprise at least one acquiring means 27 for monitoring of user activities. Such an acquiring means 27 is preferably disposed on the or in the manual operator-control instrument 10 itself, and may comprise, for example, motion sensors, position and/or acceleration sensors or a gyroscope, optical sensors or even time-measuring devices for monitoring a time overshoot for an absence of user activities, especially of user inputs. In this connection, correspondingly configured acquiring means 27 may be designed for signaling of an acquired presence or of an acquired absence of user activities relative to the at least one illumination control device 25.

Subsequently, the at least one illumination control device 25 may be designed for electrically and/or electronically controlled adaptation of a visually perceptible luminous intensity to a first, low level upon presence of a coupled signal link 22 between the safety switching element 15 and a control device 6 or a safety controller 7, and upon a signaling of a presence of user activities. In contrast, in the case of presence of a coupled signal link 22 and upon a signaling of an absence of user activities by the acquiring means 27, the illumination control device 25 may be designed for electrically and/or electronically controlled adaptation of the visually perceptible luminous intensity to a second level, which is higher in comparison to the first level. In the latter case, the adaptation or adjustment of the higher, second luminous intensity level may if necessary also take place after expiration or passage of a definable time duration following signaling of an absence of user activities.

On the basis of the often different lighting or ambient brightness of various installation components 3 or in the region of various installation components 3, a configuration form of the control system 1 may be of advantage in which respectively a code is assigned to the remote coupling station or stations 19 of a control system 1, which code contains information obtained by data technology with respect to a minimum limit intensity and/or an optimum level for the visually perceptible luminous intensity in the region of the associated installation component 3. In principle, such a code may be formed, for example, by a code saved using data technology in a memory unit of a control device 6 or safety controller 7 or in a memory unit of an illumination control device 25 itself associated with the respective remote coupling station 19. In this case, the illumination control device may be designed for direct acquisition of the code by readout of such a code from the corresponding storage unit using data technology.

Alternatively, however, it may also be provided that the illumination control device is designed for indirect acquisition of a code 28 via a code-acquiring means 29. As is illustrated in FIG. 3, it may be provided, for example, that a code-acquiring means 29, which depending on type or structure of the code 28, may be designed, for example, as a barcode or 2D-code reader or as an RFID scanner and the like, is formed on the manual operator-control instrument 10. As likewise illustrated in FIG. 3, a code 28 that can be acquired correspondingly with the code-acquiring means may therefore be, for example, a barcode or 2D code, or an RFID transponder, attached at the end in the region of the plug connection 23 of the cable 21. During establishment of a signal link 22, via the cable 21 in the exemplary embodiment shown in FIG. 3, the code 28 may then be read out by means of the code-acquiring means 29 and transmitted, for example via the cable 21, to the illumination control device 25 disposed in the remote coupling station 19.

After acquisition of the code 28, either directly by readout from a storage unit, or indirectly via the code-acquiring means 29, the illumination control device 25 may be designed for electrically and/or electronically controlled adaptation of the visually perceptible luminous intensity on the basis of the information about the code 28 obtained using data technology. In the process, the code 28 may also contain information obtained using data technology about the already described minimum limit intensity and/or the maximum limit intensity for the corresponding installation component or remote coupling station 19, or supply it relative to the illumination control device 25.

As is illustrated both in FIG. 3 and in FIG. 4, the at least one illumination control device 25 may comprise a first switching means 30, and the illumination control device 25 may be designed for activation or respectively deactivation of the illuminating device 17 by switching of the first switching means 30 to an electrically conducting or respectively a non-conducting switched state. As is illustrated in FIG. 3, it may then be provided that an illumination control device 25 disposed in the remote coupling station 19 is designed for opening or closing of an electrical current supply 31 routed by the cable 21 via the first switching means 30. According to the exemplary embodiment in FIG. 4, however, it is naturally also possible for an illumination control device 25 disposed in a manual operator-control instrument 10 to be designed for opening or closing of an internal current supply 31 for the illuminating device 17 of the manual operator-control instrument 10 via the first switching means 30.

In both cases, it may be further advantageous when the at least one illumination control device 25 is designed for electronic adaptation of the visually perceptible luminous intensity of the illuminating device 17 by impression of a pulse-width-modulated activation signal on the first switching means 30. This design variant of the illumination control device 25 permits a particularly energy-efficient, electronically controlled adaptation of the visually perceptible luminous intensity for illumination control devices 17, which are suitable for the purpose and which may be provided, for example, with luminous means formed by light-emitting diodes or LEDs.

Such a pulse-width-modulated activation signal is characterized by pulse intervals and pause intervals periodically following one another. During a pulse interval, the illumination control device 25 switches the electrical current supply 31 via the first switching means 30 such that it is conducting or closed, so that the illuminating device 17 is supplied with current and correspondingly is lit during a pulse interval. During a pause interval, the illumination control device 25 switches the electrical current supply 31 via the first switching means 30 such that it is non-conducting or open, so that the illuminating device 17 is not supplied with current and correspondingly is not lit during a pause interval. Stated in other words, the pulse-width-modulated activation signal is coupled via the first switching means 30 into the respective electrical current supply 31 or the respective illuminating device 17; see FIG. 3 or FIG. 4. In the case of sufficiently short duration or sufficiently rapid sequence of the pulse and pause intervals of the pulse-width-modulated activation signals, the human eye then perceives only the luminous intensity emitted on average by the illuminating device 17 as visually perceptible or sensed luminous intensity. In particular, in the case of sufficiently rapid sequence of the pulse and pause intervals that follow one another, for example at clock frequencies around 10 kHz, not even any flickering of the illuminating device 17 is perceptible for the human eye.

From the viewpoint of considerations of safety technology, it may additionally be provided that the at least one illumination control device 25 comprises, for activation or respectively for deactivation of the illuminating device 17, a second, switchable switching means 32, which second switching means 32 is connected electrically in series with the first switching means 30. Thereby, even during a failure of one of the switching means 30, 32, the illuminating device 17 may be reliably switched off by interruption of its energy or current supply 31 by means of the respective other switching means 30, 32, as is also illustrated in FIG. 3 and FIG. 4. In principle, the illumination control device 25 may then be designed for switching of both switching means 30, 32 into a non-conducting state, when the signal link 22 between the safety switching element 15 and the control device 6 or safety controller 7 is disconnected. In principle, the illumination control device 25 may also be designed for impression of a pulse-width-modulated activation signal on the second switching means 32.

According to the exemplary embodiments in FIG. 3 and FIG. 4, it may be provided, moreover, that at least one checking means 33 for the checking of the conduction state or switched state of the switching means 30, 32 (singular and plural) is associated with the at least one illumination control device 25, and the illumination control device 25 is designed for the checking of the proper non-conducting state of the switching means 30, 32 (singular and plural) by means of the at least one checking means 33 upon presence of a deactivated state of the illuminating device 17. As illustrated in FIG. 3 and FIG. 4, the checking means 33 may then be formed, for example, by a current-measuring means incorporated in the electrical current supply 31, by means of which it can be checked whether or not an illuminating device 17 is being supplied with current. Alternatively, other checking means 33 can be used for this purpose, for example checking means 33 that directly acquire a respective switched state of the switching means 30, 32 (singular and plural). In principle, a direct optical acquisition of the light emitted by the illuminating device 17 or the lack of light emission is also conceivable, and so the checking means 33 may also be formed in principle by a light-sensitive sensor device. The use of such light-sensitive sensor devices or sensor means for the control system 1 will be explained in more detail in the following.

In this connection, it may also be provided, for example, that the at least one illumination control device 25 is designed for execution of a test cycle, which test cycle comprises, in periodic sequence, alternately the switching of one of the switching means 30, 32 respectively into a non-conducting state, and which comprises the simultaneous switching of the other switching means 30, 32 (singular and plural) into a conducting state. In this way, the illumination control device 25 is able, via the checking means 33, to check each individual switching means 30, 32 cyclically for its functionality, or the illumination control device 25 is able, by execution of a corresponding test cycle, to check whether each of the switching means 30, 32 can be switched into a proper, nonconducting state.

Furthermore, it may be provided that a signal-link-state checking means 34 is associated with the at least one illumination control device 25 using signal technology, which signal-link-state checking means 34 is designed for the continuous checking of the coupling state of the signal link 22, and that the illumination control device 25 is designed for activation of the illuminating device 17 in the case of a coupled state of the signal link 22, and is designed for deactivation of the illuminating device 17 in the case of a disconnected state of the signal link 22. Such signal-link state checking means 34 may then be designed, for example, for detection of a proper electrical current flow or test current via the signal link 22, for example a signal link 22 routed via the cable 21, as is illustrated by way of example on the basis of the embodiment illustrated in FIG. 3. Alternatively, a signal-link state checking means 34 is also conceivable that is designed for the checking of a proper signal transmission via a hard-wired signal link 22 or, as is illustrated in FIG. 4, for the checking of a proper signal transmission via a wireless signal link 22. For hard-wired signal links 22, it is also possible in principle to create an established or disconnected state of a hard-wired signal link 22 via the acquisition of an established or coupled or disconnected or decoupled plug connection 23, as is also illustrated in greatly simplified manner in FIG. 3. Thus a signal-link state checking means 34 may be formed by a coupling-state checking means 35, for example a magnetic or inductive sensor, or an optical sensor for acquisition of whether the plug connection 23 has been established or disconnected, as is shown in FIG. 3.

As is further illustrated in FIG. 3, but also in the exemplary embodiment illustrated in FIG. 4, the at least one illumination control device 25 may be connected to at least one first luminous-intensity-sensitive sensor means 36 using data signal technology. The illustrated first sensor means 36 may be structurally disposed in a region close to the safety switching element 15, and may be provided for acquisition of the ambient brightness in the region close to the safety switching element 15. Alternatively, such a sensor means also may be disposed with the safety switching element or its shell, for acquisition of the ambient brightness. Regardless of this, the first sensor means 36 may be disposed on the manual operator-control instrument 10 in such a way that a light-acquiring direction for the first sensor means 36 is disposed pointing away from the safety switching element 15, as is indicated by the arrows 37 in FIG. 3 and FIG. 4.

By virtue of the acquisition of the ambient brightness, information for optimized adaptation of the visually perceptible luminous intensity of the illuminating device 17 can be supplied for the illumination control device 25, especially continuously. The at least one illumination control device 25 may then be designed for automatic, electrical or electronic adaptation, on the basis of the acquired ambient brightness, of the visually perceptible luminous intensity of the illuminating device 17. Likewise, the illumination control device 25 may be designed for automatic dynamic predesignation of adaptation, on the basis of the acquired ambient brightness, of a minimum limit intensity for the illuminating device 17.

In particular, it may be provided that the illumination control device 25 is designed for the increase of the visually perceptible luminous intensity of the illuminating device 17 using regulation technology and/or for the increase of the predesignation or of a predesignated value for the minimum limit intensity upon a detected increase of the ambient brightness. In contrast, in the case of a detected decrease of the ambient brightness via the first sensor means 36, the illumination control device 25 may be designed for the decrease of the visually perceptible luminous intensity of the illuminating device 17 using regulation technology and/or for the decrease of the predesignation or of a predesignated value for the minimum limit intensity.

In practice, the illumination and lighting of the surroundings of a workplace or of an installation component may take place by any desired light source, and naturally a multiplicity of light sources may also be present. In this connection, the use of ambient light sources is also possible which, for example, are subject to periodic brightness fluctuations on the basis of their functional principle, especially during supply with alternating line voltage. LED illuminants, mercury-vapor lamps or neon tubes are mentioned as examples. In such cases, it may be provided that, for determination of the ambient brightness, a computational smoothing or filtering or a computational averaging is applied over a certain observation period, for example in the range of 200 ms, or over several measurement points following one another in time.

Hereby such fluctuations of ambient brightness can be computationally averaged out. Thereby it is possible, for example, to prevent flickering of the illuminated safety switching element by adaptation of the visual perceptible luminous intensity of the illuminating device in a manner dependent on ambient brightness.

In this connection, it is advantageous when a sampling frequency with which the ambient brightness is acquired is much higher than twice the line frequency. In no case should the acquisition of the ambient brightness be performed with a sampling rate that corresponds to twice the line frequency or to a frequency equal to twice the line frequency divided by a whole number, since then beat effects could occur under some circumstances during acquisition of the ambient brightness.

Furthermore, in this connection it may also be provided, by use of control technology, that intensity changes of the illuminating device always take only slowly, with a ramp-like transition, in the range of several seconds. Hereby it is possible to ensure that any acquired low-frequency periodic brightness changes of the ambient brightness, which may be caused, for example, by flashing signal lights present in the vicinity, are prevented by the controlled adaptation of the luminous intensity from leading to a safety switching element that is correspondingly perceptible as flashing. Thereby it is possible to prevent uncertainties or a possible confusion among observing persons concerning a significance of such a presumed light signal.

However, the first sensor means 36 may also be designed or used for acquisition of coded light signals. As is schematically illustrated in FIG. 4, the control system 1 may comprise for this purpose at least one light source 44 associated with a nearby installation component, which light source 44 is designed for emission of a coded light signal. The first luminous-intensity-sensitive sensor means 36 may be designed for acquisition and supply of the coded light signal of the light source 44 relative to the illumination control device 25.

Subsequently, it may be provided, for example, that the illumination control device 25 is designed for the supply of an information via an acquisition of a coded light signal relative to a control device 6 and/or a safety controller 7, and that the respective control device 6 and/or safety controller 7 is designed for release at least of observation-relevant control commands only in the case of a supply of an information via an acquisition of a coded light signal by the illumination control device 25.

Thereby the surroundings of a particular machine or installation component can be lit with a light signal having an installation-specific coding. Subsequently, it can be ensured that particular operator-control commands, especially control commands relevant to observation, can be executed only as long as the operator-control person is situated at least in the field of view of the respective installation component and is able to visually acquire and monitor the effect of his or her operator-control actions.

The at least one illumination control device 25 may be additionally connected using hard-wired data-signal technology to a second luminous-intensity-sensitive sensor means 38, which second sensor means 38 is provided for acquisition of an actual value of the luminous intensity of the illuminating device 17. For this purpose, the second sensor means 38 may in turn be structurally disposed in a region close to the safety switching element 15 in such a way on the manual operator-control instrument 10 that a light-acquisition direction for the second sensor means 38 is disposed pointing toward the safety switching element 15, as is indicated by the arrows 39 in FIG. 3 and FIG. 4. Alternatively, an arrangement of such a second sensor means is in turn possible within the safety switching element or its shell. Regardless of this, an actual value of the luminous intensity emitted for by the illuminating device 17 can be supplied continuously for the illumination control device 25 by the second sensor means 38.

Subsequently, the illumination control device 25 may be designed for comparison of the acquired actual value of the luminous intensity of the illuminating device 17 with a target value that is internally defined and/or generated using control technology for the luminous intensity. A target value generated using control technology may then be generated, for example, on the basis of or in dependence on an ambient brightness that has been detected or acquired by means of the first, light-sensitive sensor means 36. Subsequently, the illumination control device 25 may be designed, for example, on the basis of the comparison during detection of an overshoot of a defined limit value for a permissible deviation of the actual value from the target value, for the supply of a target-value error signal relative to a control device 6 and/or a safety controller 7 of the control system 1. In the process, the illumination control device 25 may naturally be configured for the supply of the target-value error signal both during undershoot and during overshoot of the target value. In principle, different permissible deviations may also be defined in this connection for an undershoot or overshoot respectively of the target value.

In connection with the acquisition of the actual value of the luminous intensity of the illuminating device 17, the at least one illumination control device 25 may in principle be designed for comparison of the acquired actual value of the luminous intensity of the illuminating device 17 with a target value that is internally defined and/or generated using control technology for the luminous intensity. In an advantageous improvement, the illumination control device 25 may be designed for electrical and/or electronic correction, on the basis of this comparison, of the visually perceptible luminous intensity of the illuminating device 17. By virtue of this configuration form, aging-related deviations of the luminous intensity of the illuminating device 17, for example, may be corrected by means of the illumination control device 25, automatically or using regulation technology.

As already described, the at least one illumination control device 25 may be designed for adaptation of the visually perceptible luminous intensity by impression of a pulse-width-modulated activation signal on the illuminating device 17. In this case, it may be expedient when the second sensor means 38 is designed for acquisition of a time variation of the pulse-width-modulated light emitted by the illuminating device 17. In this way, a means for the checking of the proper function of the illuminating device 17 can be supplied for the illumination control device 25 by the second sensor means 38. In this way, the illumination control device 25 may be designed for comparison of a sensor signal of the second sensor means 38 acquired during a pulse time interval of the pulse-width-modulated activation signal with a sensor signal of the second sensor means 38 acquired during a pause time interval of the pulse-width-modulated activation signal. Subsequently, the illumination control device 25 may be designed for the supply of a pulse-pause error signal relative to a control device 6 and/or a safety controller 7 of the control system 1 upon a negative checking result or of a negative result of the comparison, for example during a detected deviation of the time variation of the pulse-width-modulated activation signal and of the time variation of the pulse-width modulated light emitted by the illuminating device.

The at least one illumination control device 25 may also be designed for comparison of the sensor data supplied by the first sensor means 36 and/or the second sensor means 38 with reference data that can be stored or that were stored in advance in the control system 1. Such reference data may be saved, for example, in a memory unit of a control device 6 or of a safety controller 7 of the control system 1, and may be read out electronically by the at least one illumination control device 25 upon establishment of a signal link 22 between the safety switching element 15 and the control device 6 or safety controller 7. As an example, however, such reference data may also be formed by measured data of the first and/or second sensor means 36, 38, which are supplied for the illumination control device 25 during a use of the manual operator-control instrument 10 and are saved by the illumination control device 25 in a memory unit. The illumination control device 25 is designed for the supply of a deviation error signal relative to a control device 6 and/or to a safety controller 7 of the control system 1 upon an overshoot of a permissible deviation of the sensor data from the reference data.

Moreover, the at least one illumination control device 25 may comprise a current-measuring means 40 for determination of the electrical current flow drawn by the illuminating device 17, as is illustrated in FIG. 3 and FIG. 4. Such a current-measuring means 40 may be formed, for example, by a measuring transformer, which supplies a measured value for the illumination control device 25 using signal or data technology. Subsequently, the illumination control device 25 may be designed for comparison of the acquired current-measurement data with reference data saved in a memory unit of the control system 1. Upon an overshoot of a predesignated deviation of the determined current-flow data from the saved reference data, the illumination control device 25 may then be designed for the supply of a current-flow error signal relative to a control device 6 and/or to a safety controller 7 of the control system 1.

Upon a supply by the illumination control device 25 of one of the described error signals, i.e. of a target-value, pulse-pause, deviation and/or current-flow error signal, for example, the corresponding control device 6 or the corresponding safety controller 7 may be designed for immediate transformation of the installation 2 or of the affected installation components 3 into a safe state. Thereby a loss of safety of the installation, for example due to defects on the illuminating device 17 with the increased risk of an mistake of a person concerning the effectiveness of the safety switching element if an emergency occurs, can be prevented until a necessary servicing or repair measure, for example, can be performed.

In this connection, it may also be provided that the control device 6 and/or the safety controller 7 is designed for coupling, using signal technology, in a way signal-equivalent to a manually actuated safety switching element 15, of an error signal supplied by the illumination control device 25 into a safety circuit 41 for the installation 2 or the installation component 3, as is also illustrated in greatly simplified and schematic manner in FIG. 3 and FIG. 4.

Additionally or alternatively, however, the corresponding control device 6 or the corresponding safety controller 7 may also be designed, for example, for the blocking of safety-relevant control commands, especially by deactivation of a tuning signal from a tuning key integrated in the manual operator-control instrument and/or, for example, for the display of the error signal or of the error signals upon supply of an error signal by the illumination control device 25.

A further embodiment, which if necessary is independent in itself, of the control system or systems 1, is shown in FIG. 5, wherein once again like reference symbols or structural-part designations are used, as in the foregoing FIG. 1 to FIG. 4. To avoid unnecessary repetitions, the detailed description in the foregoing FIG. 1 to FIG. 4 is invoked or reference is made thereto.

Figure 5:
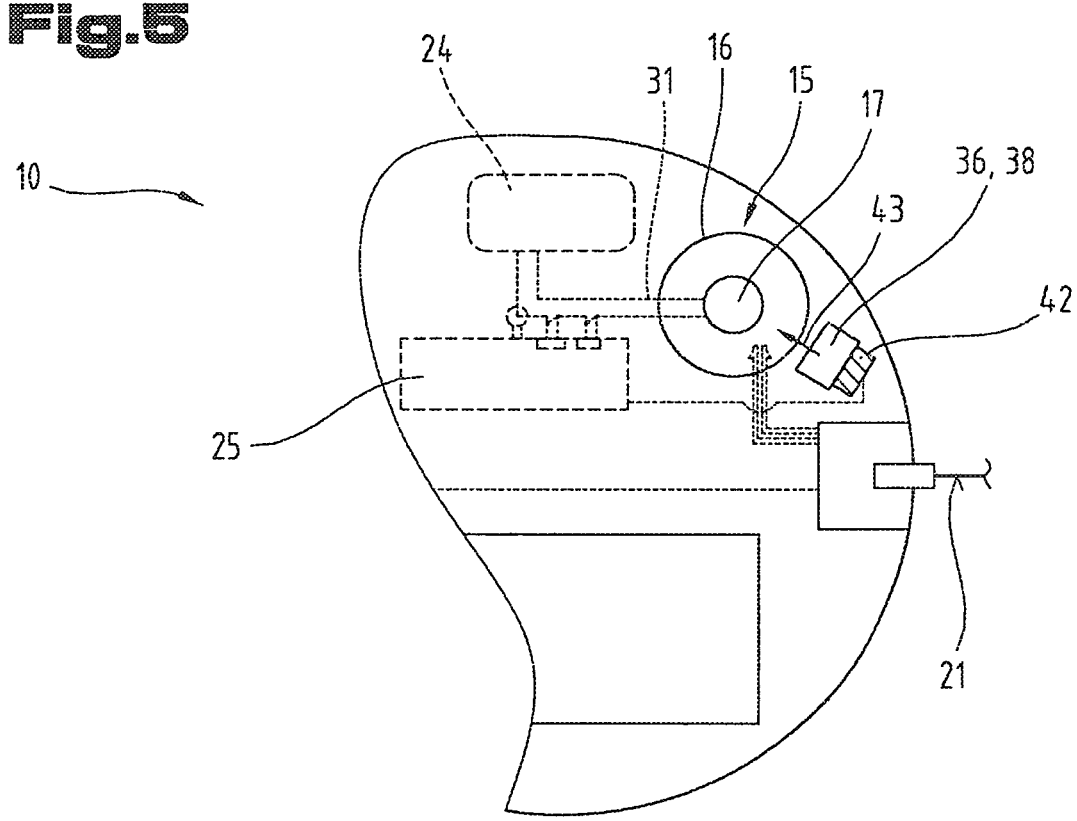
FIG. 5 shows, in sectional view, an exemplary embodiment of a possible configuration form of a sensor means arrangement for the illumination control device.

The configuration variant illustrated in FIG. 5, may be of advantage in a design of the at least one illumination control device 25 for impression of a pulse-width-modulated activation signal on the illuminating device 17. As illustrated in FIG. 5, it may be provided in such cases that the first sensor means 36 and the second sensor means 38 have a common intensity-acquiring element 42, and that the at least one illumination control device 25 is designed for periodic polling of the intensity-acquiring element 42 during pulse time intervals and pause time intervals of a pulse-width-modulated activation signal for the illuminating device 17.

Expressed in other words, the first sensor means 36 and the second sensor means 38 may be structurally formed substantially by a sensor means or a sensor device that is disposed in a nearby region with its light-acquisition direction—indicated by arrow 43—oriented in the direction of the safety switching element 15. The distinction between the first sensor means 36, provided for acquisition of the ambient brightness, and the second sensor means 38, provided for acquisition of an actual value of the luminous intensity of the illuminating device, is given or defined in this case by the specific polling at times one after another of the common intensity-acquiring element 42 by the illumination control device 25. Since the pulse time intervals and pause time intervals are predesignated by the illumination control device 25 and therefore are known or predesignated using control technology, the illumination control device 25 may be designed for corresponding polling at times one after another of the common intensity-acquiring element 42. In these cases, the first and the second sensor means may therefore also be designated or understood as the virtual first sensor means 36 and virtual second sensor means 38.

In particular, the at least one illumination control device 25 may be designed for determination of the ambient brightness from the sensor data polled during pause time intervals, since the illuminating device 17 is not supplied with energy or electrical current and therefore does not light up during the pause time intervals of the pulse-width-modulated activation signal.

Figure 6:
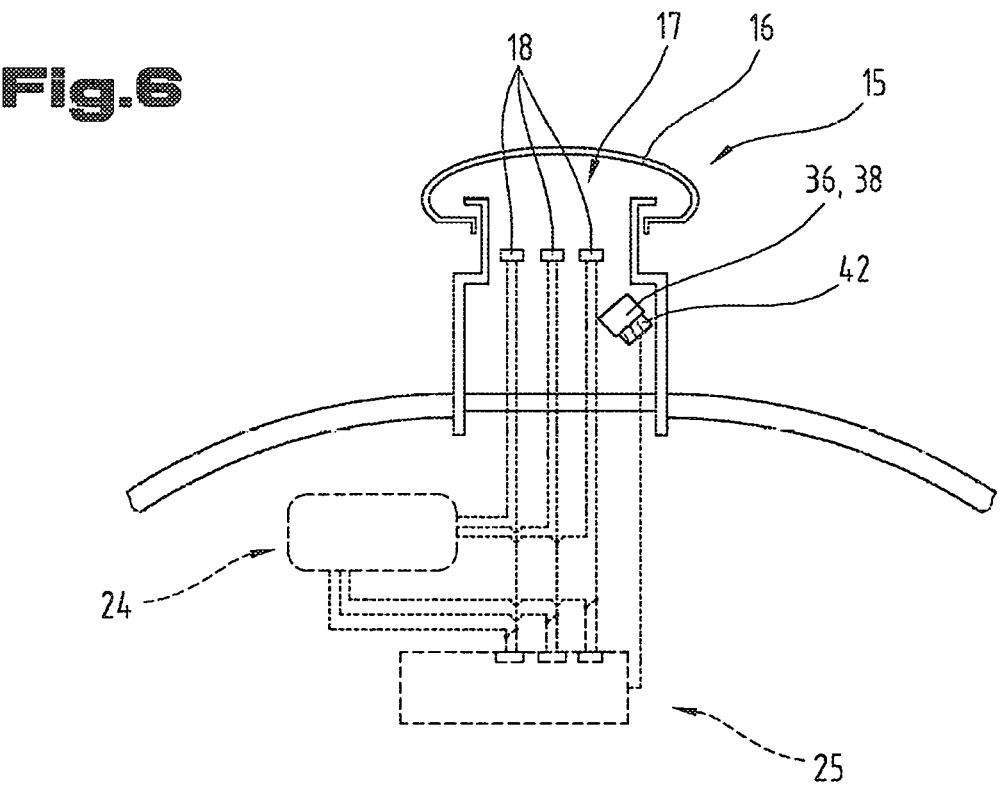
FIG. 6 shows, in sectional view, an exemplary embodiment of possible configuration forms of an illuminating device, sensor means and illumination control device.

Alternatively to the exemplary embodiments illustrated in FIG. 2 to FIG. 5, a further embodiment, which if necessary may be independent in itself and which is illustrated in FIG. 6, may also be expedient. Once again, like reference symbols or structural-part designations, as in the foregoing FIG. 1 to FIG. 5, are used in FIG. 6 for like parts. To avoid unnecessary repetitions, the detailed description in the foregoing FIG. 1 to FIG. 5 is invoked or reference is made thereto.

As illustrated in FIG. 6, the first sensor means 36 and the second sensor means 38 or the common intensity-acquiring element 42 may be disposed structurally within the shell 16 of the safety switching element 15. This in particular represents a structurally particularly efficient and space-saving configuration form of the manual operator-control instrument 10.

In general, the luminous intensity of the illuminating device 17 and also the ambient brightness may in principle be acquired either directly by sensor means 36, 38 disposed within the safety switching element 15 or its shell 16 or by externally disposed sensor means or sensor devices after passage through the semitransparent shell 16 of the safety switching element 15. Regardless of the arrangement of the first and second sensor means 36, 38 or of the common intensity-acquiring element 42 within or outside the safety switching element 15 or its translucent or semitransparent shell 16, the respectively acquired luminous intensity of the illuminating device 17 may be adapted in scaled or computational manner by corresponding computational adaptation or computational conversion of the corresponding acquired or measured luminous intensities into values especially digital that respectively can be readily exploited. Especially for due consideration of any absorption and scattering losses by the semitransparent shell 16 in the case of sensor means 38 or intensity-acquiring elements 42 disposed outside the safety switching element 15, it is also possible if necessary to use computational calibration methods for compensation.

By analogy, it is naturally also possible for a respective ambient brightness to be acquired in principle by a sensor means 36 disposed within the semitransparent shell 16 of the safety switching element 15. In this connection, the brightness that is measured through the shell by means of a sensor means 36 or an intensity-acquiring element 42 and that at worst deviates from the actual ambient brightness by absorption and/or light-scattering effects and the like, may in turn be appropriately computationally adapted or corrected in order to obtain the actual ambient brightness, once again by application, for example, of computational calibration methods or the like.

As is further illustrated in FIG. 6, the illuminating device 17 may be provided with several variously colored luminous means 18. In such a configuration form of the illuminating device 17, the at least one illumination control device 25 may be designed for separate electrically and/or electronically controlled adaptation of the individual luminous means 18, as is also illustrated schematically in FIG. 6.

Finally, a configuration variant may also be provided in which the at least one illumination control device 25 is designed for electrically or electronically controlled adaptation of the illuminating device 17 or of the individual luminous means 18 by a display signal, especially by a visually perceptible flashing signal, in the case of an actuated safety switching element 15. Hereby signaling options that can be respectively individually adapted or realized by regulation technology are made possible by the illumination control device 25 and, depending on necessary and/or respectively desired embodiment, can be executed by the illumination control device 25.

The exemplary embodiments show possible embodiment variants, wherein it must be noted at this place that the invention is not restricted to the specially illustrated embodiment variants of the same, but to the contrary diverse combinations of the individual embodiment variants with one another are also possible and, on the basis of the teaching of the technical handling by the subject invention, this variation possibility lies within the know-how of the person skilled in the art and active in this technical field.

The scope of protection is defined by the claims. However, the description and the drawings are to be used for interpretation of the claims. Individual features or combinations of features from the shown and described different exemplary embodiments may represent inventive solutions that are independent in themselves. The task underlying the independent inventive solutions may be inferred from the description.

Finally, it must be pointed out as a matter of form, that some elements have been illustrated not to scale and/or magnified and/or reduced for better understanding of the structure.

LIST OF REFERENCE NUMERALS

1 Control system
2 Installation
3 Installation component
4 Robot processing station
5 Coating chamber
6 Control device
7 Safety controller
8 Communication link
9 Communication link
10 Manual operator-control instrument 11 Output means
12 Operator-control person
13 Input means
14 Controller
15 Safety switching element
16 Shell
17 Illuminating device
18 Luminous means
19 Remote coupling station
20 Radio link
21 Cable
22 Signal link
23 Plug connection
24 Current-supply means
25 Illumination control device
26 input-setting means
27 Acquiring means
28 Code
29 Code-acquiring means
30 Switching means
31 Current supply
32 Switching means
33 Checking means
34 Signal-link-state checking means
35 Coupling-state checking means
36 Sensor means
37 Arrow
38 Sensor means
39 Arrow
40 Current-measuring means
41 Safety circuit
42 Intensity-acquiring element
43 Arrow
44 Light source

The invention claimed is:

1. A control system (1) for electrically controlled installations (2), comprising:
    at least one control device (6) for monitoring and control of the installation (2);
    at least one mobile manual operator-control instrument (10) is configured for displaying of installation information and for inputting of control commands by an operator-control person (12), wherein a wireless or wired connection is provided between the mobile manual operator-control instrument and the at least one control device, wherein the manual operator-control instrument (10) is provided with at least one manually actuatable safety switching element (15), wherein said safety element (15) includes an illuminating device (17) having at least one luminous means (18);
    a signal link (22) connecting between the safety switching element (15) of the manual operator-control instrument (10) and the at least one control device (6), which is configured to be coupled or decoupled as needed; wherein the control system (1) is configured for transformation of the installation (2) into a safe state upon a presence of coupled signal link (22) and upon manual actuation of the safety switching element (15), wherein the control system (1) is configured for activating of the illuminating device (17) upon the presence of a coupled signal link (22) and for deactivating of the illuminating device (17) upon the presence of a decoupled signal link (22); and
    at least one illumination control device (25) is configured for electrically or electronically controlled adaptation of a visually perceptible luminous intensity of the illuminating device (17) upon the presence of a coupled signal link (22).

2. The control system according to claim 1, wherein at least one manually adjustable input-setting means (26) is associated functionally effectively with the at least one illumination control device (25), wherein the illumination control device (25) is designed for electrically or electronically controlled adaptation, on a basis of the respective setting of the input-setting means (26), of the visually perceptible luminous intensity of the illuminating device (17) upon presence of a coupled signal link (22) and upon positioning of the input-setting means (26) by an operator-control person (12).

3. The control system according to claim 1, wherein the at least one illumination control device (25) is designed for electrically or electronically controlled adaptation of the visually perceptible luminous intensity of the illuminating device (17) within a restricted range between a minimum limit intensity that is defined or can be predetermined using control technology and a maximum limit intensity that is defined or can be predetermined using control technology.

4. The control system according to claim 1, wherein at least one acquiring means (27) for monitoring of user activities is provided on a manual operator-control instrument (10), which acquiring means (27) is designed for signaling an acquired presence or an acquired absence of user activities to the at least one illumination control device (25).

5. The control system according to claim 4, wherein the at least one illumination control device (25) is designed for electrically or electronically controlled adaptation of the visually perceptible luminous intensity to a first low level upon presence of a coupled signal link (22) and during a signaling of a presence of user activities and is designed for electrically or electronically controlled adaptation of the visually perceptible luminous intensity to a second level, higher in comparison with the first level, upon presence of a coupled signal link (22) and during a signaling of an absence of user activities.

6. The control system according to claim 1 further comprising at least one remote coupling station (19), which is associated with a nearby electrically controllable installation component (3), wherein the at least one remote coupling station (19) is designed at least for establishment and for disconnection of the signal link (22) between the at least one safety switching element (15) of the manual operator-control instrument (10) and a control device (6) of the installation (2) or installation component (3).

7. The control system according to claim 6, wherein the at least one remote coupling station (19) is assigned a code (28), which code (28) contains information, obtained by data technology, with respect to a minimum limit intensity or an optimum level for the visually perceptible luminous intensity in the region of the associated installation component (3), and the illumination control device (25) is designed for direct acquisition of the code or for indirect acquisition of the code (28) via a code-acquiring means (29), and for electrically or electronically controlled adaptation of the visually perceptible luminous intensity on the basis of the information about the code (28), obtained using data technology.

8. The control system according to claim 6, wherein the at least one illumination control device (25) is structurally disposed in the remote coupling station (19) on the machine side.

9. The control system according to claim 1, wherein the at least one illumination control device (25) comprises at least one first switching means (30), and the illumination control device (25) is designed for activation or respectively deactivation of the illuminating device (17) by switching of the first switching means (30) to an electrically conducting or respectively an electrically non-conducting switched state.

10. The control system according to claim 9, wherein the at least one illumination control device (25) is designed for electrically or electronically controlled adaptation of the visually perceptible luminous intensity of the illuminating device (17) by impression of a pulse-width-modulated activation signal on the first switching means (30).

11. The control system according to claim 1, wherein the at least one illumination control device (25) is structurally disposed in the manual operator-control instrument (10).

12. The control system according to claim 1, wherein the at least one illumination control device (25) is connected using data-signal technology to at least one first luminous-intensity-sensitive sensor means (36), which first sensor means (36) is structurally disposed in a region close to the safety switching element (15) or within the safety switching element (15), and which first sensor means (36) is provided for acquisition of the ambient brightness in the region close to the safety switching element (15).

13. The control system according to claim 12, wherein the at least one illumination control device (25) is designed for automatic electrically or electronically controlled adaptation of the visually perceptible luminous intensity of the illuminating device (17) on the basis of the acquired ambient brightness.

14. The control system according to claim 12, wherein the at least one illumination control device (25) is connected using hard-wired data-signal technology to a second luminous-intensity-sensitive sensor means (38), which second sensor means (38) is structurally disposed in a region close to the safety switching element (15) or within the safety switching element (15), and is designed for acquisition of an actual value of the luminous intensity of the illuminating device (17).

15. The control system according to claim 14, wherein the at least one illumination control device (25) is designed for comparison of the acquired actual value of the luminous intensity of the illuminating device (17) with a target value that is internally defined or generated using control technology for the luminous intensity, and wherein the illumination control device (25) is designed, on the basis of the comparison, for electrical or electronic correction of the visually perceptible luminous intensity of the illuminating device (17).

16. The control system according to claim 12, wherein the first sensor means (36) and the second sensor means (38) have a common intensity-acquiring element (42), and wherein the at least one illumination control device (25) is designed for periodic polling of the intensity-acquiring element (42) during pulse time intervals and pause time intervals of a pulse-width-modulated activation signal for the illuminating device (17).

17. The control system according to claim 16, wherein the at least one illumination control device (25) is designed for determination of the ambient brightness from the sensor data polled during pause time intervals.

18. The control system according to claim 12, wherein the at least one illumination control device (25) is designed for automatic dynamic imposition of a minimum limit intensity for the illuminating device (17) on the basis of the acquired ambient brightness.

19. The control system according to claim 1, wherein the illuminating device (17) has several differently colored luminous means (18) and wherein the at least one illumination control device (25) is designed for separate electrically or electronically controlled adaptation of the individual luminous means (18).

* * * * *